(12) United States Patent
Rath et al.

(10) Patent No.: US 11,170,588 B2
(45) Date of Patent: Nov. 9, 2021

(54) AUTONOMOUS SYSTEM VALIDATION

(71) Applicant: KPIT Technologies Limited, Maharashtra (IN)

(72) Inventors: Manaswini Rath, Pune (IN); Swastika Sahoo, Pune (IN); Ansuman Barik, Pune (IN); Badariprasad S. Kotejoshyer, Pune (IN); Prashantkumar B. Vora, Pune (IN)

(73) Assignee: KPIT Technologies Limited, Pune (IN)

( * ) Notice: Subject to any disclaimer, the term of this patent is extended or adjusted under 35 U.S.C. 154(b) by 72 days.

(21) Appl. No.: 15/713,622

(22) Filed: Sep. 23, 2017

(65) Prior Publication Data

US 2018/0089911 A1    Mar. 29, 2018

(30) Foreign Application Priority Data

Sep. 23, 2016   (IN) .............................. 201621032471

(51) Int. Cl.
| | |
|---|---|
| *G07C 5/00* | (2006.01) |
| *G07C 5/08* | (2006.01) |
| *G06Q 50/30* | (2012.01) |
| *G06Q 10/00* | (2012.01) |
| *G05D 1/00* | (2006.01) |

(52) U.S. Cl.
CPC ........... *G07C 5/0808* (2013.01); *G06Q 10/00* (2013.01); *G06Q 50/30* (2013.01); *G05D 1/0088* (2013.01)

(58) Field of Classification Search
CPC ...... G07C 5/0808; G06Q 10/00; G06Q 50/30; G05D 1/0088
See application file for complete search history.

(56) References Cited

U.S. PATENT DOCUMENTS

| | | | |
|---|---|---|---|
| 6,370,475 B1* | 4/2002 | Breed .................... | G01S 13/931 701/301 |
| 6,405,132 B1* | 6/2002 | Breed .................... | G01S 7/4802 701/301 |
| 7,102,496 B1* | 9/2006 | Ernst, Jr. .......... | G08G 1/096725 180/167 |
| 8,442,739 B2* | 5/2013 | Kuge ................. | B60K 31/0008 701/96 |
| 8,849,515 B2* | 9/2014 | Moshchuk ............. | G08G 1/167 701/42 |
| 9,151,625 B2* | 10/2015 | Lee ......................... | G01C 21/26 |
| 9,182,761 B2* | 11/2015 | Fujita .................... | G05D 1/0212 |
| 2005/0192727 A1* | 9/2005 | Shostak ................. | B60C 23/041 701/37 |
| 2005/0273218 A1* | 12/2005 | Breed .................... | B60R 21/20 701/2 |

(Continued)

*Primary Examiner* — Ian Jen
(74) *Attorney, Agent, or Firm* — Foley & Lardner LLP

(57) ABSTRACT

Aspects of the present disclosure relates to a system and method of validation of automation feature of automobile. The method of validation of an automation feature includes the steps of: assessing the automation feature to be validated; grouping functions of the automation feature into a plurality of functional areas; generating at least one scenario under which the automation feature need to be validated; decomposing the at least one scenario into a plurality of test benches, wherein each of the plurality of test benches are based on at least one functional area of the plurality of functional areas; and quantitatively validating functionality of the automation feature in at least one functional area of the plurality of functional areas.

20 Claims, 21 Drawing Sheets

(56) References Cited

U.S. PATENT DOCUMENTS

| | | | | |
|---|---|---|---|---|
| 2006/0025897 | A1* | 2/2006 | Shostak | G08G 1/017 |
| | | | | 701/1 |
| 2007/0279203 | A1* | 12/2007 | Thomas | B60C 23/0472 |
| | | | | 340/447 |
| 2008/0042812 | A1* | 2/2008 | Dunsmoir | G06K 9/00818 |
| | | | | 340/435 |
| 2008/0097699 | A1* | 4/2008 | Ono | B62D 15/0265 |
| | | | | 701/300 |
| 2008/0215231 | A1* | 9/2008 | Breed | G08G 1/161 |
| | | | | 701/117 |
| 2011/0106442 | A1* | 5/2011 | Desai | G01S 5/0072 |
| | | | | 701/532 |
| 2011/0307139 | A1* | 12/2011 | Caminiti | G08G 1/163 |
| | | | | 701/32.2 |
| 2012/0083947 | A1* | 4/2012 | Anderson | G08G 1/165 |
| | | | | 701/3 |
| 2012/0116819 | A1* | 5/2012 | Hertenstein | G06Q 40/08 |
| | | | | 705/4 |
| 2012/0323474 | A1* | 12/2012 | Breed | B60W 30/16 |
| | | | | 701/117 |
| 2013/0162479 | A1* | 6/2013 | Kelly | G01M 17/0078 |
| | | | | 342/385 |
| 2013/0325306 | A1* | 12/2013 | Caveney | G08G 1/166 |
| | | | | 701/117 |
| 2014/0037138 | A1* | 2/2014 | Sato | G06K 9/00805 |
| | | | | 382/103 |
| 2015/0134232 | A1* | 5/2015 | Robinson | G08G 1/0145 |
| | | | | 701/117 |
| 2015/0197248 | A1* | 7/2015 | Breed | G08G 1/167 |
| | | | | 701/93 |
| 2017/0270236 | A1* | 9/2017 | Yamaura | G06F 30/20 |

* cited by examiner

AUTONOMOUS SYSTEM VALIDATION

CROSS-REFERENCE TO RELATED APPLICATIONS

The present applications claims priority to and the benefit of Indian Provisional Patent Application No. 201621032471, titled "AUTONOMOUS SYSTEM VALIDATION," filed Sep. 23, 2016, the contents of which are incorporated herein by reference in their entirety.

TECHNICAL FIELD

The present disclosure generally relates to the field of Advanced Driver Assistance Systems (ADAS) and Autonomous Driving (AD). More particularly, the present disclosure relates to systems and methods for validation of an automation feature of an automobile.

BACKGROUND

Background description includes information that may be useful in understanding the present invention. It is not an admission that any of the information provided herein is prior art or relevant to the presently claimed invention, or that any publication specifically or implicitly referenced is prior art.

Today the automobile industry is swiftly moving towards solutions that support and enable novel electronic systems and features in vehicles so that it can earn profit by developing a more survivable vehicle at costs that its customers are willing to pay. This has led to the development of autonomous/automated systems. Typically, autonomous systems (e.g. autonomous vehicles) are tasked with achieving goals with reduced (or no) human contact. Such next generation automotive systems include numerous electronic systems/components such as passive safety systems for airbag deployment, anti-skid braking features, active safety for collision warning and collision avoidance features, convenience features for Blind Spot Detection (BSD), Adaptive Cruise Control (ACC) and the like.

Central to the successful implementation of the advanced safety systems discussed above is ensuring ability for the system to cope with and recover from emergency situations. If one or more emergency conditions arise, such systems must quickly initiate and successfully execute procedures to mitigate the condition and then recover. These procedures must be performed under tight timing constraints, e.g., pre-crash systems.

In general, when a new electronic component/automation feature is developed, it is preferably tested for any malfunction(s). For example, after a newly developed vehicle component is mounted on a vehicle, performance of the component is suitably tested through a vehicle driving test (on-road testing) under various conditions.

Track tests and laboratory simulations are widely used in the automotive industry to evaluate and verify characteristics, designs and durability of a vehicle and/or a component or subsystem thereof. Vehicular components, such as sensors, actuators and processing units are commonly tested in a simulated environment before finalizing the production of a vehicle. The goal of the testing is to ensure component and system fidelity. The cost of an error in a vehicular component may be enormous, and its consequences may be disastrous. For example, an undetected error in a component of a vehicle may cause the injury of a person and in severe cases death of the person relying on the designated behavior of that particular component and/or related components.

While these traditional techniques or methods are effective, they are relatively costly and time consuming mainly due to the use of a real car for testing the prototype in a real operational setting, commonly known as in-vehicle testing/validation. Preparation for the testing using the car requires considerably large amount of time and number of processes. Further, collecting reliable test results under a desired input condition inevitably demands repetition of the same testing using the car in order to compensate for deviation from the desired input condition, increasing the amount of time and number of processes. The deviation occurs due to different road profiles and/or different driving skills. These tests often require driving pre-release or pre-series vehicles for extended periods over a large number of miles.

Conventional simulations or testing systems tend to apply testing conditions only to one component or a group of closely linked subsystems without considering influence of other subsystems or components thereon and on the overall vehicle behavior. Further, such simulations work under an assumption that characteristics of the component or subsystem under consideration/test remain unchanged during the testing. Accordingly, such testing conditions and vehicle models are static in nature i.e. they do not take into account, any changes. However, this does not hold true majority of times as characteristics of the component under test change over time, and hence, affect the vehicle model and test parameters or testing conditions.

If the simulation does not consider such changes in the test parameters or conditions, the test result would be unreliable. Thus, the obtained measurements are limited to performances of the subsystem or parts under test. Influence of the subsystem or part under test on vehicle behavior is not known directly and in a real time manner. Separate design and testing can result in possible incompatibility issues during final assembly and integration of the subsystems to actually form the integrated system.

The automotive industry today implements features in such a way that all aspects are contained within the system (federated) and therefore reasonably controlled. However, timing errors can induce more errors in the system than a bad measurement. With respect to systems validation, methods and tools must be developed to support the inevitable evolution that is about to happen in the global transportation industry—an evolution from federated systems to fully integrated systems.

As it stands today, there is much art published documenting research and development in the area of validation of autonomous/automation features. However, existing solutions focus only on validation of single functional block and/or restrict validation to either function or safety or performance of the system, necessitating validation using pre-release or pre-series vehicles for extended periods over a large number of miles. Additionally, these solutions provide low flexibility of test setups to address different validation platform selection requirements. These drawbacks, apart from others, as a person skilled in the art would know or appreciate, preclude successful implementation of such systems and validation methods at commercial setups.

Therefore, there is a need for system(s) and method(s) for validation of automation feature(s) of an automobile that does not suffer from the drawbacks of known art. Need is also felt to provide validation methodology(ies) and test setup(s) that is/are aimed at increasing robustness during development of features in the form of maturity of functional components. Need is also felt to provide validation methodology(ies) and test setup(s) that cover(s) a large number of scenarios that cannot be reliably tested on roads during the on-road testing/validation.

All publications herein are incorporated by reference to the same extent as if each individual publication or patent application were specifically and individually indicated to be incorporated by reference.

Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about". Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

An object of the present disclosure is to provide systems and methods for validation of automation features of an automobile with different levels of automation and across all functionalities.

Another object of the present disclosure is to provide systems and methods for validation of automation features that reduces the need of on-road testing of vehicles, either whole or at least in part, and covers large number of scenarios that may not be covered in on-road testing.

Another object of the present disclosure is to provide systems and methods that provide component reusability and enhancement for the test bench setup with active load emulation in closed loop.

Another object of the present disclosure is to provide systems and methods for validation of automation features with regard to all of system function, safety and performance.

Another object of the present disclosure is to provide systems and methods for validation of automation features to increase robustness during the development of automation features in the form of maturity of functional components.

Another object of the present disclosure is to provide systems and methods for validation of automation features with flexibility of test setups to address different validation platform selection requirements like system with RTOS or embedded processor.

Yet another object of the present disclosure is to provide systems and methods for validation of automation features of an automobile that allow adoption of open architecture, can be customized to meet requirements and can be adapted to work for in-house developed features and/or OEM provided (off-the-shelf) features.

SUMMARY

The present disclosure generally relates to the field of Advanced Driver Assistance Systems (ADAS) and Autonomous Vehicles. More particularly, the present disclosure relates to systems and methods for validation of an automation feature of an automobile.

An aspect of the present disclosure provides a system for validation of an automation feature of an automobile, the system comprising a non-transitory storage device having embodied therein one or more routines operable to facilitate the validation of the automation feature of the automobile; and one or more processors coupled to the non-transitory storage device and operable to execute the one or more routines, wherein the one or more routines include an automation feature assessment and functionality segregation module configured to assess the automation feature and group functions of the automation feature into a plurality of functional areas; an automation feature based scenario(s) development module configured to generate at least one scenario under which the automation feature need to be validated; scenario(s) decomposition based test bench(es) configuration module configured to decompose the at least one scenario into a plurality of test benches, wherein each of the plurality of test benches is based on at least one functional area of the plurality of functional areas; and a test bench execution module configured to quantitatively validate the plurality of functional areas of the automation feature in the plurality of test benches.

In an embodiment, the system further includes a test bench execution based evaluation matrix generation module, wherein said test bench execution based evaluation matrix generation module is configured to generate an evaluation matrix based on any or a combination of automation feature function validation measurand(s), automation feature performance validation measurand(s), and automation feature safety validation measurand(s). In an embodiment, the system further includes an evaluation matrix based validation report generation module, wherein the evaluation matrix based validation report generation module is configured to generate validation report(s) based on output of the test bench execution module and the test bench execution based evaluation matrix generation module, for instance based on the generated evaluation matrix. In an embodiment, the plurality of functional areas is selected from a group including: sensing and perception; situation analysis and planning; decision and logic building; and actuation and motion control. In an embodiment, the system is configured to perform validation of the automation feature in the automobile in real-time.

It would be appreciated that each or any combination of above mentioned modules can be implemented across one or more different computing devices, which may or may not be networked (operatively coupled) with each other. It is further to be appreciated that each module can be divided into one or more sub-modules, or alternatively, one or more modules can be combined, all of which potential embodiments are well within the scope of the present disclosure. For instance, the test bench execution based evaluation matrix generation module and the evaluation matrix based validation report generation module can be combined so as to generate a validation report directly from the outcome of the test benches.

In an embodiment, the automation feature is a feature with automation Level-2 and beyond as defined by National Highway Traffic Safety Administration (NHTSA). In an embodiment, any one or all of the plurality of test benches includes a plant model, which is based on any or a combination of first principles, machine learning, and test data collection. In an embodiment, the automation feature is selected from a group including, but not limited to, Autonomous Emergency Braking (AEB), Autonomous valet parking, and Highway AutoPilot.

Another aspect of the present disclosure relates to a method of validation of an automation feature of an automobile, the method including the steps of: (a) assessing the automation feature to be validated; (b) grouping functions of the automation feature into a plurality of functional areas; (c) generating at least one scenario under which the automation feature need to be validated; (d) decomposing the at least one scenario into a plurality of test benches, wherein each of the plurality of test benches are based on at least one functional area of the plurality of functional areas; and (e) quantitatively validating functionality of the automation feature in at least one functional area of the plurality of functional areas.

In an embodiment, the method further includes the step of generating an evaluation matrix based on any or a combination of automation feature function validation measurand(s), automation feature performance validation measurand(s), and automation feature safety validation measurand(s). In an embodiment, the method further includes the step of generating validation report(s) based on output of the test bench execution module and the test bench execution based evaluation matrix generation module. In an embodiment, the plurality of functional areas includes sensing and perception, situation analysis and planning, decision and logic building, and actuation and motion control. In an embodiment, the automation feature is a feature with automation Level-2 and beyond as defined by National Highway Traffic Safety Administration (NHTSA). In an embodiment, validation of the automation feature in the automobile is performed in substantially real-time. In an embodiment, any one or all of the plurality of test benches include a plant model that is based on any or a combination of first principles, machine learning, and test data collection. In an embodiment, the automation feature is selected from a group including, but not limited to, Autonomous Emergency Braking (AEB), Autonomous valet parking, and Highway AutoPilot.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1:
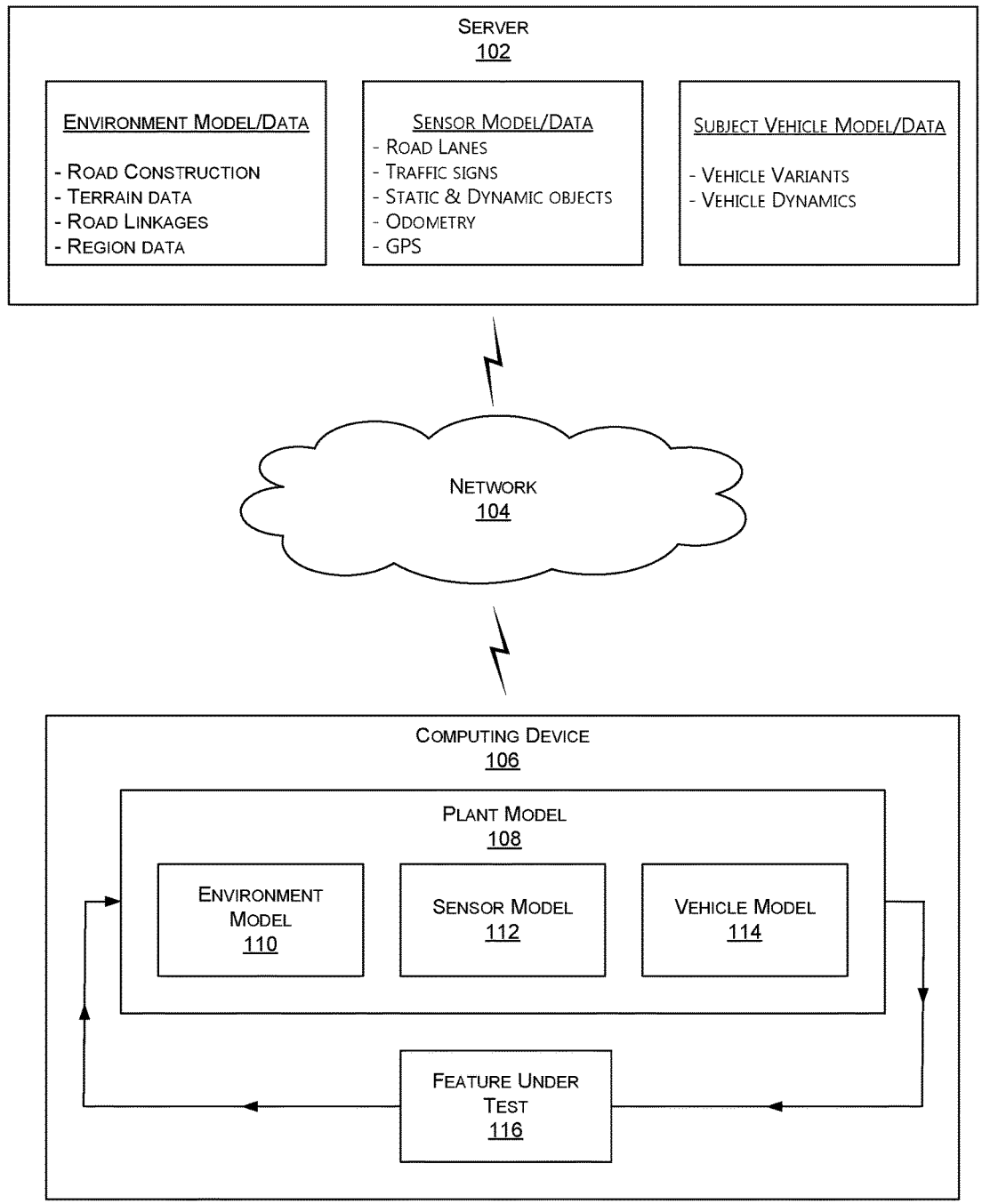
FIG. 1 illustrates an exemplary architecture of a system for validation of an automation feature of an automobile in accordance with an implementation of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present disclosure generally relates to the field of Advanced Driver Assistance Systems (ADAS) and Autonomous Driving (AD). More particularly, the present disclosure relates to systems and methods for validation of an automation feature of an automobile.

The present disclosure generally relates to the field of Advanced Driver Assistance Systems (ADAS) and Autonomous Vehicles. More particularly, the present disclosure relates to systems and methods for validation of an automation feature of an automobile.

An aspect of the present disclosure provides a system for validation of an automation feature of an automobile, the system comprising a non-transitory storage device having embodied therein one or more routines operable to facilitate the validation of the automation feature of the automobile; and one or more processors coupled to the non-transitory storage device and operable to execute the one or more routines, wherein the one or more routines include an automation feature assessment and functionality segregation module configured to assess the automation feature and group functions of the automation feature into a plurality of functional areas; an automation feature based scenario(s) development module configured to generate at least one scenario under which the automation feature need to be validated; scenario(s) decomposition based test bench(es) configuration module configured to decompose the at least one scenario into a plurality of test benches, wherein each of the plurality of test benches is based on at least one functional area of the plurality of functional areas; and a test bench execution module configured to quantitatively validate the plurality of functional areas of the automation feature in the plurality of test benches.

In an embodiment, the system further includes a test bench execution based evaluation matrix generation module, wherein said test bench execution based evaluation matrix generation module is configured to generate an evaluation matrix based on any or a combination of automation feature function validation measurand(s), automation feature performance validation measurand(s), and automation feature safety validation measurand(s). In an embodiment, the system further includes an evaluation matrix based validation report generation module, wherein the evaluation matrix based validation report generation module is configured to generate validation report(s) based on output of the test bench execution module and the test bench execution based evaluation matrix generation module, for instance based on the generated evaluation matrix. In an embodiment, the plurality of functional areas is selected from a group including: sensing and perception; situation analysis and planning; decision and logic building; and actuation and motion control. In an embodiment, the system is configured to perform validation of the automation feature in the automobile in real-time.

It would be appreciated that each or any combination of above mentioned modules can be implemented across one or more different computing devices, which may or may not be networked (operatively coupled) with each other. It is further to be appreciated that each module can be divided into one or more sub-modules, or alternatively, one or more modules can be combined, all of which potential embodiments are well within the scope of the present disclosure. For instance, the test bench execution based evaluation matrix generation module and the evaluation matrix based validation report generation module can be combined so as to generate a validation report directly from the outcome of the test benches.

In an embodiment, the automation feature is a feature with automation Level-2 and beyond as defined by National Highway Traffic Safety Administration (NHTSA). In an embodiment, any one or all of the plurality of test benches includes a plant model, which is based on any or a combination of first principles, machine learning, and test data collection. In an embodiment, the automation feature is selected from a group including, but not limited to, Autonomous Emergency Braking (AEB), Autonomous valet parking, and Highway AutoPilot.

Another aspect of the present disclosure relates to a method of validation of an automation feature of an automobile, the method including the steps of: (a) assessing the automation feature to be validated; (b) grouping functions of the automation feature into a plurality of functional areas; (c) generating at least one scenario under which the automation feature need to be validated; (d) decomposing the at least one scenario into a plurality of test benches, wherein each of the plurality of test benches are based on at least one functional area of the plurality of functional areas; and (e) quantitatively validating functionality of the automation feature in at least one functional area of the plurality of functional areas.

In an embodiment, the method further includes the step of generating an evaluation matrix based on any or a combination of automation feature function validation measurand(s), automation feature performance validation measurand(s), and automation feature safety validation measurand(s). In an embodiment, the method further includes the step of generating validation report(s) based on output of the test bench execution module and the test bench execution based evaluation matrix generation module. In an embodiment, the plurality of functional areas includes sensing and perception, situation analysis and planning, decision and logic building, and actuation and motion control. In an embodiment, the automation feature is a feature with automation Level-2 and beyond as defined by National Highway Traffic Safety Administration (NHTSA). In an embodiment, validation of the automation feature in the automobile is performed in substantially real-time. In an embodiment, any one or all of the plurality of test benches include a plant model that is based on any or a combination of first principles, machine learning, and test data collection. In an embodiment, the automation feature is selected from a group including, but not limited to, Autonomous Emergency Braking (AEB), Autonomous valet parking, and Highway AutoPilot.

FIG. 1 illustrates an exemplary architecture of a system for validation of an automation feature of an automobile in accordance with an implementation of the present disclosure. As illustrated, the system includes a server 102 including, but not limited to, any or a combination of environment model data, sensor model data, subject vehicle model data and the like, connected to one or a plurality of computing devices 106 over a network 104, wherein the computing devices 106 is configured to execute validation for the automation feature of automobile. In an exemplary implementation, one or a combination of plant model 108 including environment model 110, sensor model 112, vehicle model 114 and the like and a simulation model for the feature under test (validation) 116 is configured on a computing device 106. In an implementation, the environment model 110 includes, but not limited to, data pertaining to road construction, road type and the likes such as motorway, highway, interstate road, rural road, arterial road, urban road, residential road, parking area and deck and garage. In an implementation, the sensor model 112 includes, but not limited to, data pertaining to traffic such as non-motorized traffic, motorized type A traffic, motorized type B traffic, mixed traffic and the likes. In an implementation, the vehicle model 114 includes, but not limited to, data pertaining to subject vehicle such as vehicle body and type, vehicle steering system, vehicle powertrain system, vehicle braking system, vehicle suspension, vehicle tyre, vehicle load and the likes, data pertaining to driver such as IPG driver, autonomous driving feature command, manual driver and the likes. In an implementation, the computing device 106 is any or a combination of personal computer, desktop, mobile, PDA and the like as known to or appreciated by a person reasonably skilled in the art. In an implementation, data is transmitted between the server 102 and the computing device 106 utilizing any network protocols as known to or appreciated by a person skilled in the art, for instance, TCP/IP. In an implementation, the server 102 is a distributed server and the network 104 is a cloud server.

Figure 2:
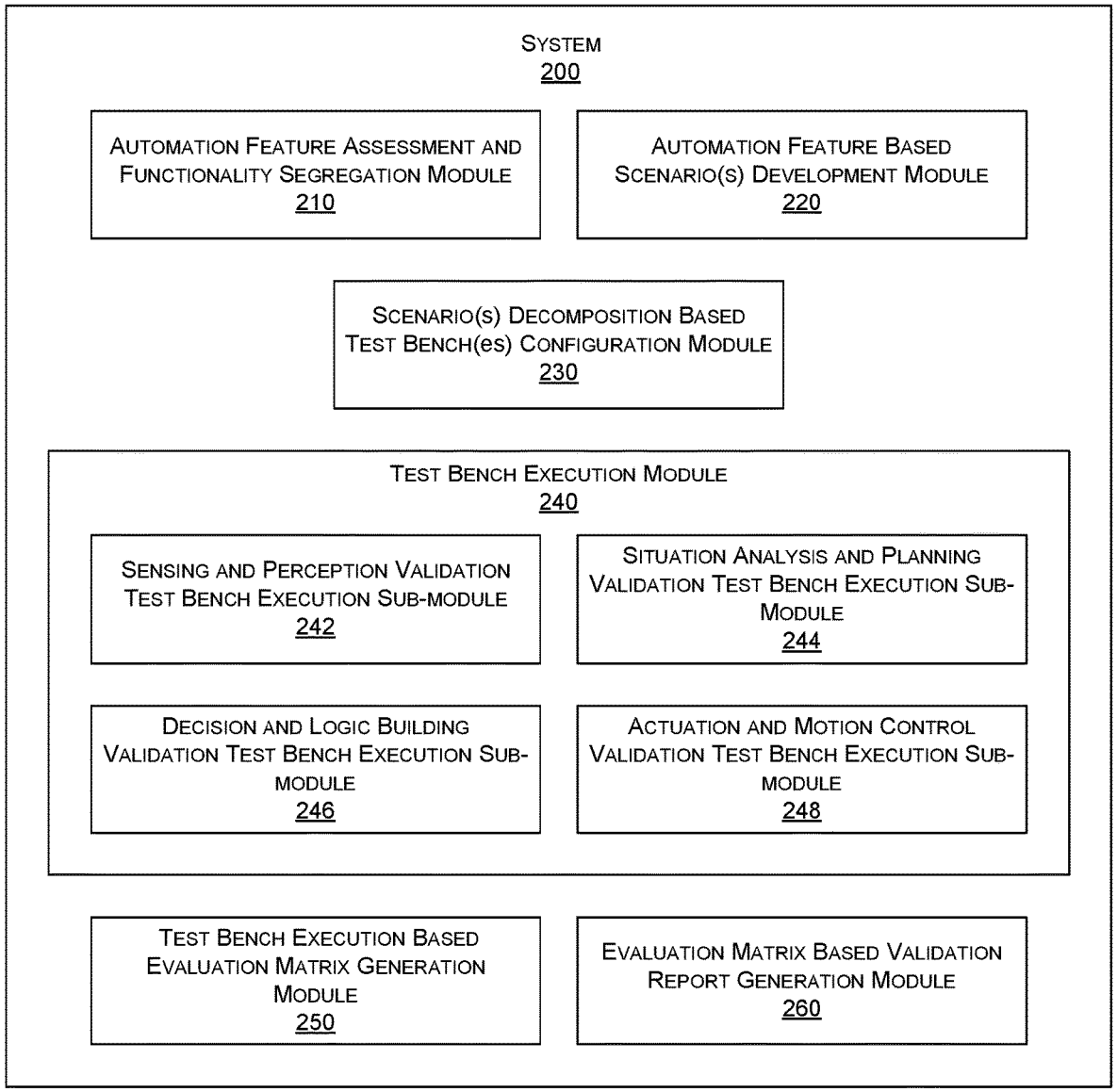
FIG. 2 illustrates an exemplary block diagram depicting functional modules of a system for validation of an automation feature of an automobile in accordance with an implementation of the present disclosure.

FIG. 2 illustrates an exemplary block diagram depicting functional modules of a system 200 for validation of an automation feature of an automobile in accordance with an implementation of the present disclosure. As illustrated, the system 200 includes an automation feature assessment and functionality segregation module 210, an automation feature based scenario(s) development module 220, a scenario(s) decomposition based test bench(es) configuration module 230, a test bench execution module 240, a test bench execution based evaluation matrix generation module 250, and an evaluation matrix based validation report generation module 260.

In an implementation, automation feature assessment and functionality segregation module 210 is configured to assess automation feature of an automobile to be validated, wherein the automation feature is selected from, for instance, any of the known automation features as known to a person reasonably skilled in the art without departing from the scope and spirit of the invention, including but not limited to, automation features with automation level between Level-1 and Level-5 as defined by National Highway Traffic Safety Administration (NHTSA). Preferably, the automation feature with automation level between Level-2 and Level-5 as defined by NHTSA is selected. In an exemplary implementation, the automation feature is selected from Autonomous Emergency Braking (AEB), Autonomous valet parking and Highway AutoPilot.

In an implementation, automation feature assessment and functionality segregation module 210 is configured to group functions of the automation feature into a plurality of functional areas, which is selected based on group(s) of logical functions that the automation feature under validation is intended to serve, including but not limited to sensing and perception, situation analysis and planning, decision and logic building, and actuation and motion control. However, any other functional areas can be included and/or selected, as known or appreciated by a person reasonably skilled in the art, without departing from the scope and spirit of the present disclosure.

In a preferred implementation, automation feature assessment and functionality segregation module 210 is configured to assess the automation feature and group functions of the automation feature into a plurality of functional areas. Most preferably, module 210 is configured to assess the automation feature and group functions of the automation feature into four functional areas viz. sensing and perception, situation analysis and planning, decision and logic building, and actuation and motion control.

In an implementation, automation feature based scenario(s) development module 220 is configured to generate at least one scenario under which the automation feature need to be validated. The scenario can be chosen from any scenario that the automation feature is expected to work in, for example, day time with clear weather, day time with cloudy weather, multiple lanes with lane markings visible, temporary loss of parametric value(s) like lane attributes, vehicle in adjacent lane cutting-in to the host vehicle's lane, insertion of threat object(s), sudden acceleration or deceleration of the vehicle moving in front of the subject vehicle, parking slot/space selection, unmarked/unmapped environment, tail-gating, traffic jam and the like. However, it should be appreciated that any other scenario as known to or appreciated by a person reasonably skilled in the art can be selected.

In an implementation, scenario(s) decomposition based test bench(es) configuration module 230 is configured to decompose the at least one scenario into a plurality of test benches. In an exemplary implementation, each of the plurality of test benches is based on at least one functional area. In an implementation, the scenario is decomposed into a sensing and perception validation test bench, a situation analysis and planning validation test bench, a decision and logic building validation test bench, and an actuation and motion control validation test bench.

In an implementation, test bench execution module 240 is configured to execute quantitative validation of one or more functional areas of the automation feature in any one, some or all of the plurality of test benches. Preferably, test bench execution module 240 quantitatively validates each of the functional areas of the automation feature in the selected scenario to generate values corresponding to functional, performance and safety measurands. In an implementation, test bench execution module 240 is configured to execute qualitative validation of one or more functional areas of the automation feature in any one, some or all of the plurality of test benches. Preferably, test bench execution module 240 qualitatively validates each of the functional areas of the automation feature in the selected scenario, corresponding to functional, performance and safety measurands.

In an implementation, test bench execution module 240 includes a plurality of sub-modules each corresponding to a test bench to execute quantitative and/or qualitative validation of each of the functional areas. In a preferred implementation, test bench execution module 240 includes a sensing and perception validation test bench execution sub-module 242, a situation analysis and planning validation test bench execution sub-module 244, a decision and logic building validation test bench execution sub-module 246, and an actuation and motion control validation test bench execution sub-module 248. In an implementation, the test bench execution module 240 is further configured to collate values from each of the sub-modules 242 through 248 to generated consolidated values corresponding to functional, performance and safety measurands for the automation feature.

In an implementation, functional measurands, performance measurands and safety measurands can be any or a combination of subject vehicle control force, subject vehicle speed range, subject vehicle time headway, subject vehicle trigger, subject vehicle manoeuvre coordination, driver qualification, driver location, driver monitoring, driver activation, but not limited thereto. In an implementation, test bench execution module 240 qualitatively validates each of the functional areas of the automation feature in the selected scenario, and provides output corresponding to functional, performance and safety measurands including, but not limited to, subject vehicle control force being low, medium or high, subject vehicle speed range being low, medium or high, subject vehicle time headway being standard, reduced or small, subject vehicle trigger being system initiated, driver approved or driver initiated, subject vehicle manoeuvre coordination being with driver or without driver, driver qualification being professional or non-professional, driver location being inside the automobile, outside the automobile or automobile being tele-operated, driver monitoring being need to monitor or need not be monitored, driver activation being attentive, inattentive, drowsy or sleeping, and the likes.

In an implementation, test bench execution module 240 validates each of the functional areas of the automation feature in the selected scenario, either quantitatively or qualitatively or a combination thereof, and provides output values corresponding to functional, performance and safety measurands, wherein the test bench execution module 240 is configured to generate values corresponding to functional, performance and safety measurands by taking reference from any or a combination of standard or consortium or organization's vehicle engineering goals. For example, in case of measurement of vehicle manoeuvre time headway as a validation measurand, the test bench execution module 240 or any of the sub-modules thereof can either classify/tag it as standard, in case the time was found to be <0.5 seconds, as reduced, in case time was found to be between 0.5 to 0.9 seconds, or as small in case the time was found to be >0.9 seconds. Alternatively, the test bench execution module 240 can directly output these values.

In an implementation, test bench execution based evaluation matrix generation module 250 is configured to generate an evaluation matrix based on one or more measurands. Preferably, measurand(s) is/are selected from, but not limited to, automation feature function validation measurand(s), automation feature performance validation measurand(s), and automation feature safety validation measurand(s). Alternatively, any other measurand(s) can be included and/or selected, as known or appreciated by a person reasonably skilled in the art, without departing from the scope and spirit of the present disclosure.

In an implementation, evaluation matrix based validation report generation module 260 is configured to generate validation report(s) based on output of the test bench execution module 240 and the test bench execution based evaluation matrix generation module 250. In an implementation, evaluation matrix based validation report generation module 260 is configured to collect values corresponding to functional, performance and safety measurands of the automation feature in the selected scenario from the test bench execution module 240 and reference values corresponding to functional, performance and safety measurands of the automation feature in the selected scenario from the test bench execution based evaluation matrix generation module 250. In an exemplary implementation, the evaluation matrix based validation report generation module 260 can further be configured to compare values obtained from the module 240 with the reference values obtained from module 250 to generate validation report(s) corresponding to any one or some or all functional areas of the automation feature. Alternatively, module 260 can be configured to generate a consolidated validation report to validate any or a combination of function, performance and safety of the automation feature under validation, rather than generating report(s) corresponding to any one or some or all functional areas of the automation feature.

Figure 3:
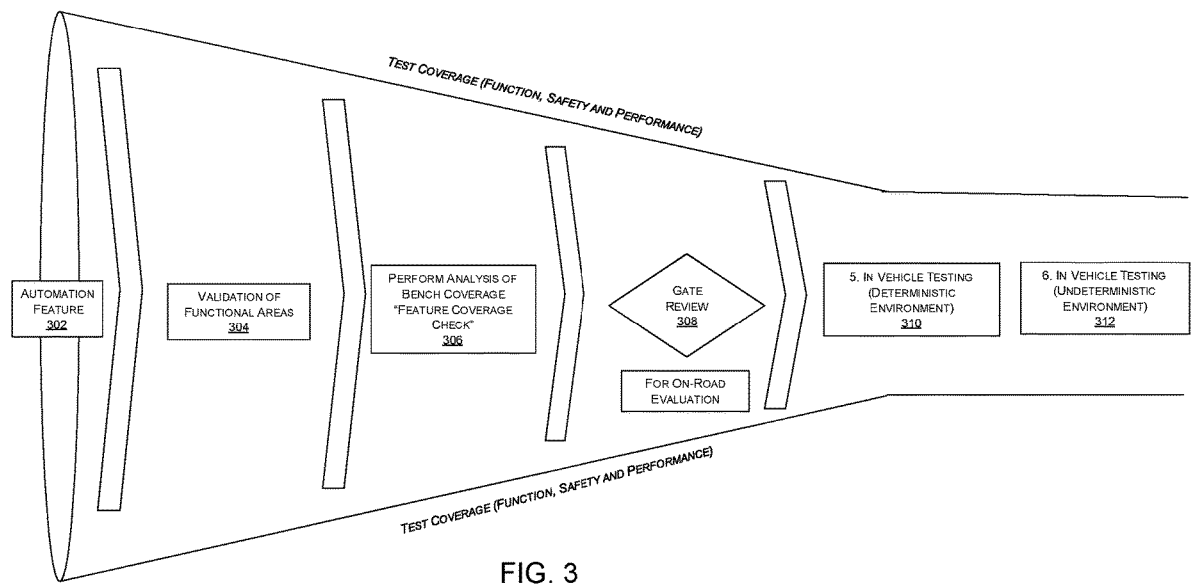
FIG. 3 illustrates an exemplary flow diagram depicting an overall approach for validation of an automation feature of an automobile in accordance with an implementation of the present disclosure.

FIG. 3 illustrates an exemplary flow diagram depicting an overall approach for validation of an automation feature of an automobile in accordance with an embodiment of the present disclosure. As illustrated, at step 302, automation feature of an automobile is selected for validation, wherein, at step 304, validation of functional area(s) of the automation feature under a variety of scenarios, in which the automation feature is intended to and/or expected to work, is done utilizing the system realized in accordance with implementations of the present disclosure. As shown at step 306, analysis of the test bench coverage (or automation feature coverage) is done. Once the automation feature of the automobile is validated satisfactorily under a plurality of scenarios, as shown at step 308, the automation feature of the automobile is considered for on-road testing (in-vehicle testing). As shown at steps 310 and 312, validated automation feature(s) are subjected to in-vehicle testing for deterministic and un-deterministic environments, respectively.

Another aspect of the present disclosure relates to a method of validation of an automation feature of an automobile, the method including the steps of: (a) assessing the automation feature to be validated; (b) grouping functions of the automation feature into a plurality of functional areas; (c) generating at least one scenario under which the automation feature need to be validated; (d) decomposing the at least one scenario into a plurality of test benches, wherein each of the plurality of test benches are based on at least one functional area of the plurality of functional areas; and (e) quantitatively validating functionality of the automation feature in at least one functional area of the plurality of functional areas.

In an embodiment, the method further includes the step of generating an evaluation matrix based on any or a combination of automation feature function validation measurand(s), automation feature performance validation measurand(s), and automation feature safety validation measurand(s). In an embodiment, the method further includes the step of generating validation report(s) based on output of the test bench execution module and the test bench execution based evaluation matrix generation module. In an embodiment, the plurality of functional areas includes sensing and perception, situation analysis and planning, decision and logic building, and actuation and motion control. In an embodiment, the automation feature is a feature with automation Level-2 and beyond as defined by National Highway Traffic Safety Administration (NHTSA). In an embodiment, validation of the automation feature in the automobile is performed in substantially real-time. In an embodiment, any one or all of the plurality of test benches include a plant model that is based on any or a combination of first principles, machine learning, and test data collection. In an embodiment, the automation feature is selected from a group including, but not limited to, Autonomous Emergency Braking (AEB), Autonomous valet parking, and Highway Auto-Pilot.

Figure 4:
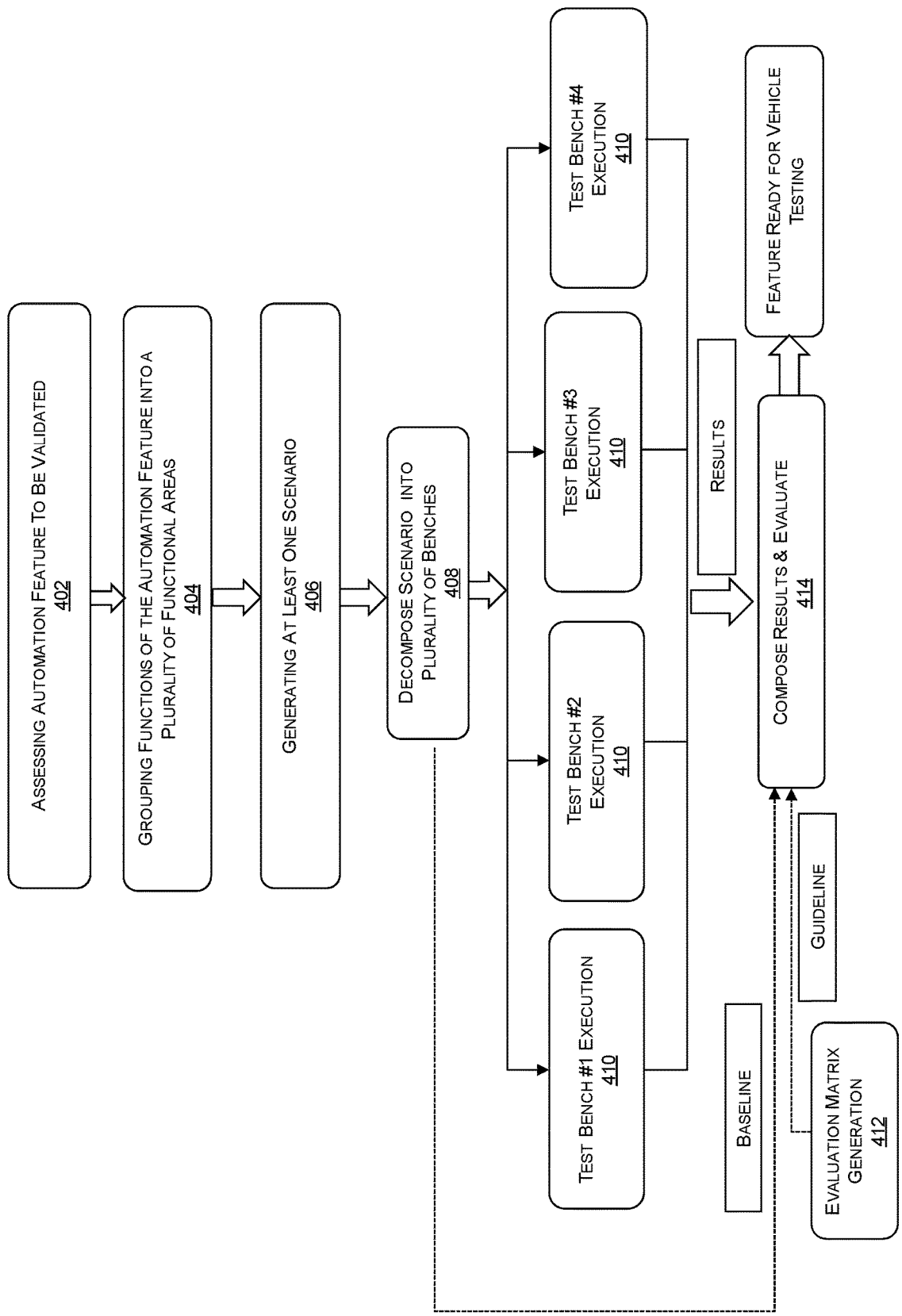
FIG. 4 illustrates an exemplary flow diagram depicting a method of validation of an automation feature of an automobile in accordance with an implementation of the present disclosure.

FIG. 4 illustrates an exemplary flow diagram depicting a method of validation of an automation feature of an automobile in accordance with an implementation of the present disclosure. As shown at step 402, assessment of an automation feature of an automobile, for which validation need to be performed, is carried out. As shown at step 404, functions of the automation feature are grouped into one or a plurality of functional area(s). As shown at step 406, at least one scenario under which the automation feature need to be validated is generated, wherein, at step 408, the at least one scenario is decomposed into a plurality of test benches. In an implementation, each of the plurality of test benches is based on at least one functional area of the one or a plurality of functional area(s). As shown at step 410, quantitative validation of each of the one or a plurality of functional areas of the automation feature in the selected scenario is performed to generate values corresponding one or more measurand(s). In an implementation, the one or more measurand(s) is selected from automation feature function validation measurand(s), automation feature performance validation measurand(s), and automation feature safety validation measurand(s). As shown at step 412, an evaluation matrix based on one or more measurands is generated. In an implementation, the one or more measurand(s) is selected from automation feature function validation measurand(s), automation feature performance validation measurand(s), and automation feature safety validation measurand(s). As shown at step 414, validation report(s) is/are generated based on evaluation of (a) values generated from quantitative validation of one or a plurality of functional areas of the automation feature corresponding to one or more measurand(s), and (b) evaluation matrix including reference values for the one or a plurality of functional areas of the automation feature in the selected scenario corresponding to one or more measurand(s).

Figure 5:
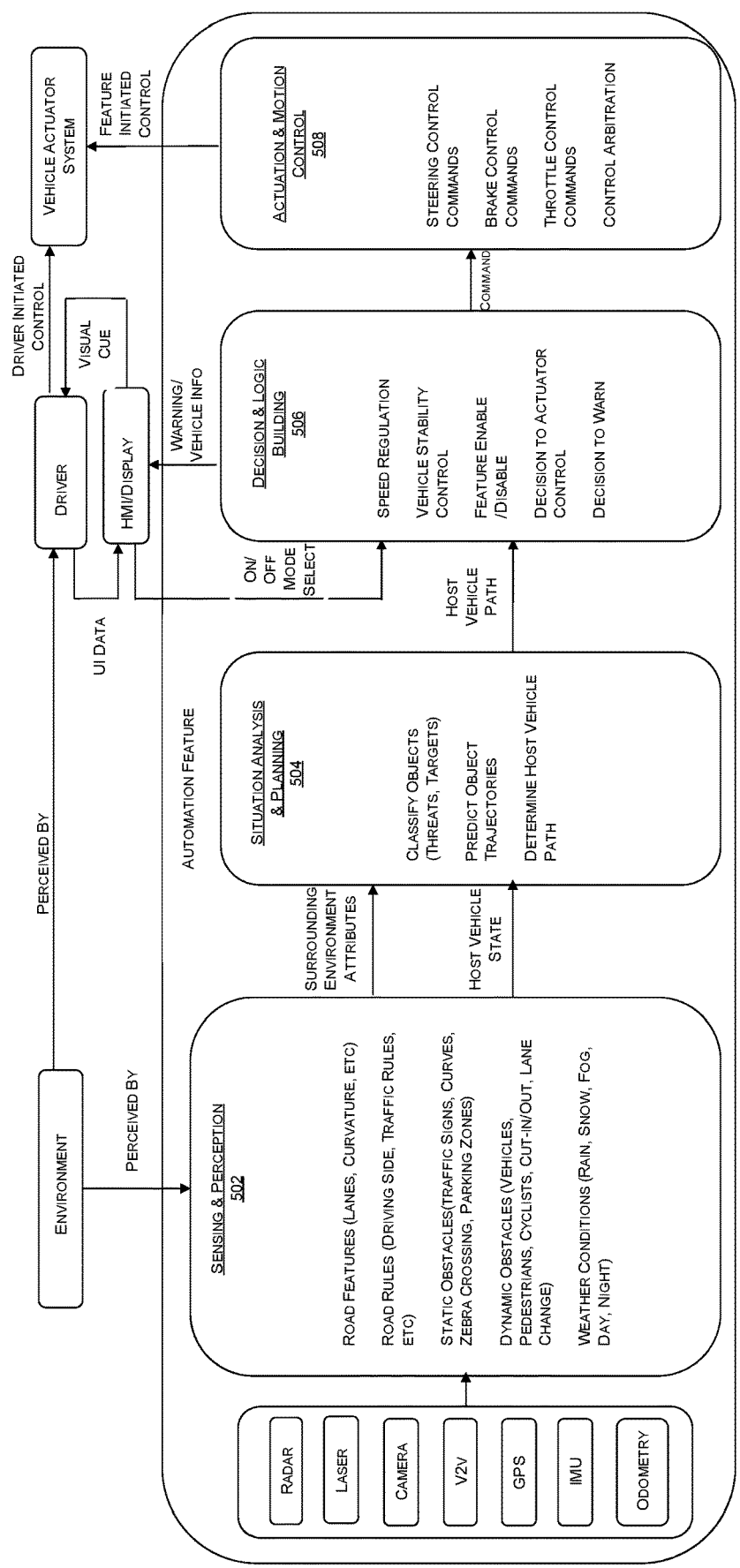
FIG. 5 illustrates an exemplary diagram depicting various functions of an automation feature including their interactions with and/or flow of data amongst the system and the driver and grouping of these functions into a plurality of functional areas in accordance with an implementation of the present disclosure.

FIG. 5 illustrates an exemplary diagram depicting various functions of an automation feature including their interactions with and/or flow of data amongst the system and the driver and grouping of these functions into a plurality of functional areas in accordance with an implementation of the present disclosure. As illustrated, in an exemplary implementation, all logical functions of an automation feature can be grouped into four functional areas viz. sensing and perception 502, situation analysis and planning 504, decision and logic building 506, and actuation and motion control 508. In an implementation, one or a combination of evaluation of road features including, but not limited to, lanes, curvature and the like, road rules including, but not limited to, driving side, traffic rules and the like, static obstacles including, but not limited to, traffic signs, curves, zebra crossing, parking zones and the like, dynamic obstacles including, but not limited to, vehicles, pedestrians, cyclists, cut-in/out, lane change and the like, weather conditions including, but not limited to, rain, snow, fog, day, night and like functions can be grouped into functional area sensing and perception 502. In an implementation, classification of objects including, but not limited to, threats, targets and the like, prediction of object trajectories, determination of host vehicle path and the like functions can be grouped into functional area situation analysis and planning 504. In an implementation, functions including but not limited to speed regulation, vehicle stability control, feature enablement/disablement, decision to control actuator, decision to warn and the like can be grouped into functional area decision and logic building 506. In an implementation, functions including but not limited to issuing steering control commands, brake control commands, throttle control commands, control arbitration and the like can be grouped into functional area actuation and motion control 508. Although several of the embodiments and/or implementations of the present disclosure illustrate grouping of functions of an automation feature of an automobile into four functional areas viz. sensing and perception, situation analysis and planning, decision and logic building, and actuation and motion control, a person reasonably skilled in the art would appreciate that any one or some or all logical functions of an automation feature can be grouped into any number of functional areas to serve its intended purpose as laid down in various implementations and/or embodiments of the present disclosure without departing from the scope and spirit of the invention. In an implementation, the automation feature to be validated is one with the automation level 2 as defined by NHTSA, for example, Inter Urban AEB (Autonomous Emergency Braking) and the like. In an implementation, the automation feature to be validated is one with the automation level 3 as defined by NHTSA, for example, Highway Autopilot, Valet parking and the like. In an implementation, the automation feature to be validated is one with the automation level 4 as defined by NHTSA. In an implementation, the automation feature to be validated is one with the automation level 5 as defined by NHTSA. Although several of the embodiments and/or implementations of the present disclosure illustrate validation of an automation feature with automation level between level 2 and level 5 as defined by NHTSA, a person reasonably skilled in the art would appreciate that any other automation feature of any automation level as defined by any of the competent authorities for example, The Society of Automotive Engineers (SAE), National Highway Traffic Safety Administration (NHTSA) and the like can be validated utilizing advantageous systems and methods as laid down in various embodiments and/or implementations of the present disclosure without departing from the scope and spirit of the invention.

Figure 6:
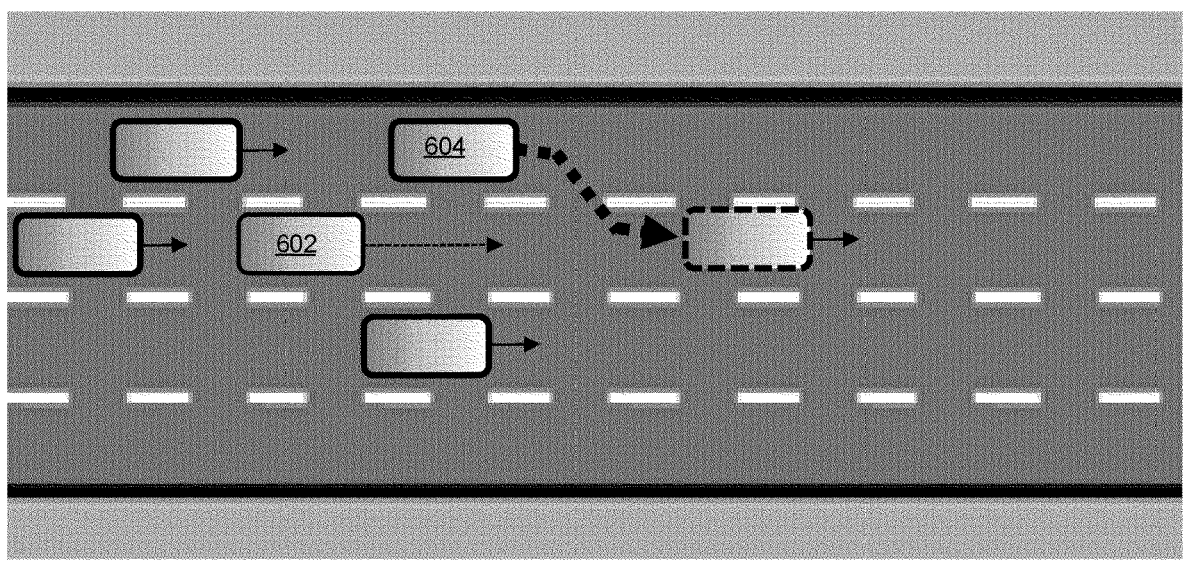
FIG. 6 illustrates an exemplary view of target cut-in scenario for an automation feature—Highway Assist in accordance with an implementation of the present disclosure.

FIG. 6 illustrates an exemplary view of target cut-in scenario for an automation feature—Highway Assist in accordance with implementations of the present disclosure, wherein 602 denotes host (subject) vehicle and 604 denotes target vehicle. As a person reasonably skilled in the art would know and/or appreciate, Highway Assist, an automation feature of with automation level-3 as defined by NHTSA, provides one or more of the following functionalities to aid the driver on highway—(a) steering assistance to center the host vehicle with lane (lateral control), (b) longitudinal assistance by maintaining safe distance from vehicles in front, (c) perform lane change manoeuvre upon initiation from the driver, (d) supervision of driver to ensure continuous involvement to be in loop, (e) collision mitigation and the like. Typically, Highway Assist feature is activated on highways where subject vehicle is driven at a speed ranging from about 60 km/hour to about 140 km/hour. Further, this feature may or may not be enabled with the driver-in-loop.

In accordance with implementations of the present disclosure, functions of the Highway Assist is assessed and grouped into a plurality of functional areas. In an implementation, functions including but not limited to detection of objects and their states, objects in surrounding, associated lanes, road curvature to follow, determination of host vehicle state and the like by using multiple ADAS and AD sensors and the like are grouped in the sensing and perception functional area; functions including but not limited to determination of the target of interest to follow, tracking of target of interest (whether fast or slow cut-in), detected objects and the like are grouped in the surrounding situation analysis and planning functional area; functions including but not limited to computation of required speed to maintain, activation of braking command signals to maintain safe distance, activation of steering command to follow the lane, generating applied braking and steering information on HMI and the like are grouped in the decision and logic building functional area; and functions including but not limited to actuation of brake control (control speed with feedback from vehicle speed), actuation of steering control and the like are grouped in the actuation and motion control functional area.

Once the functions of an automation feature are grouped into one or a plurality of functional areas, a scenario (user scenario) is developed, which in this exemplary implementation includes target cut-in scenario, as illustrated in the FIG. 6. The scenario is then decomposed into a plurality of test benches, each based on a functional area of the plurality of functional areas. Accordingly, the target cut-in scenario is decomposed into four test benches, one each for the sensing and perception functional area, the situation analysis and planning functional area, the decision and logic building functional area, and the actuation and motion control functional area.

Figure 7A:
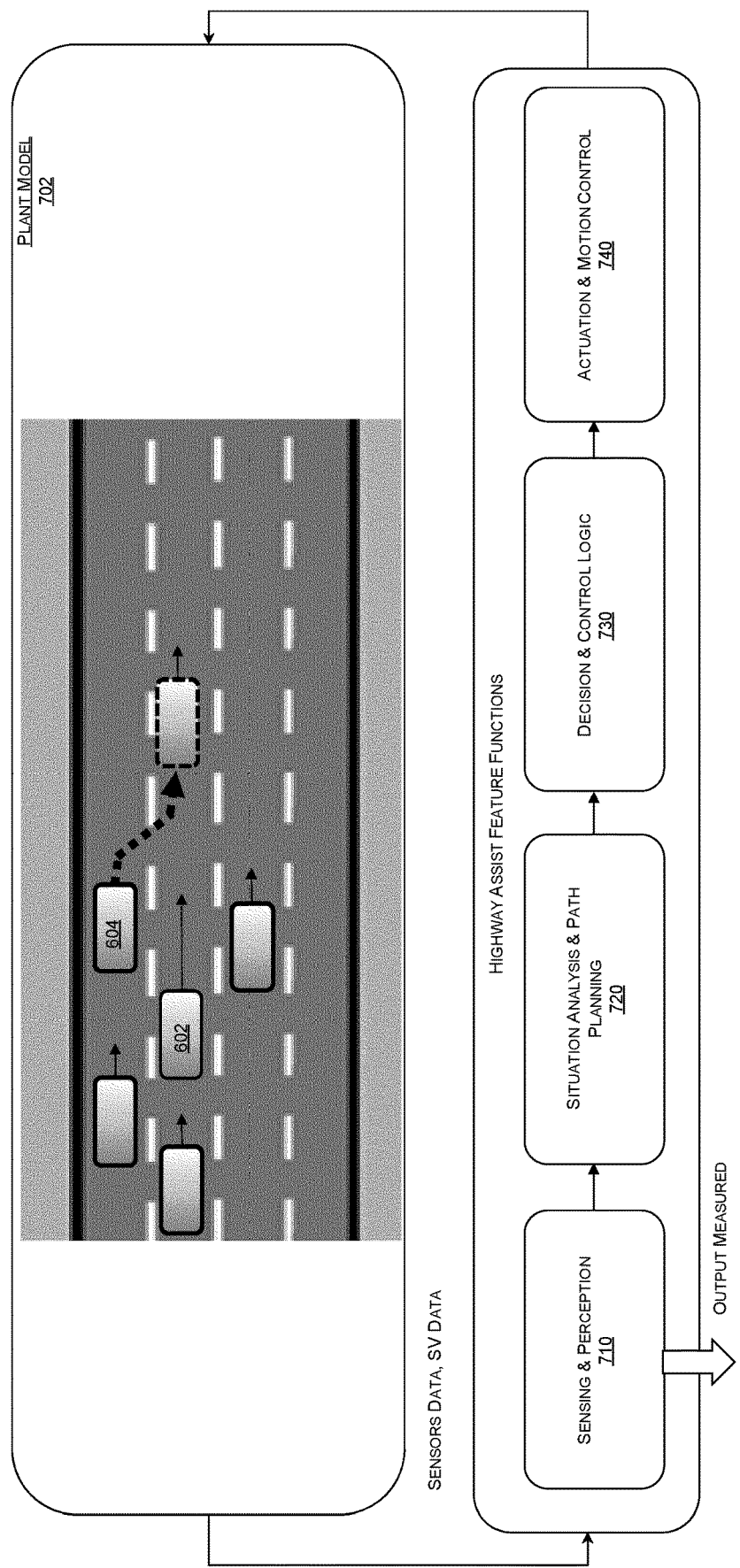
FIG. 7A illustrates an exemplary view depicting sensing and perception test bench and flow of data amongst plant model and sensing and perception test bench in accordance with an implementation of the present disclosure.

FIG. 7A illustrates an exemplary view depicting sensing and perception test bench and flow of data amongst plant model and sensing and perception test bench in accordance with an implementation of the present disclosure. As illustrated, plant model 702 includes, but not limited to, data corresponding to pre-recorded data for cut-in of other vehicles from actual sensors or trained sensors models, data corresponding to the subject vehicle, simulated model of the host vehicle and the like. This data is sent to sensing and perception test bench 710 to execute validation and measure host state data, detected object list, lane markings, object attributes (velocity, position etc.) and the like (shown as measurement of output in FIG. 7A). The validation measurands corresponding to sensing and perception test bench 710 are subject vehicle speed range, subject vehicle time headway, driver monitoring and driver activation.

Figure 7B:
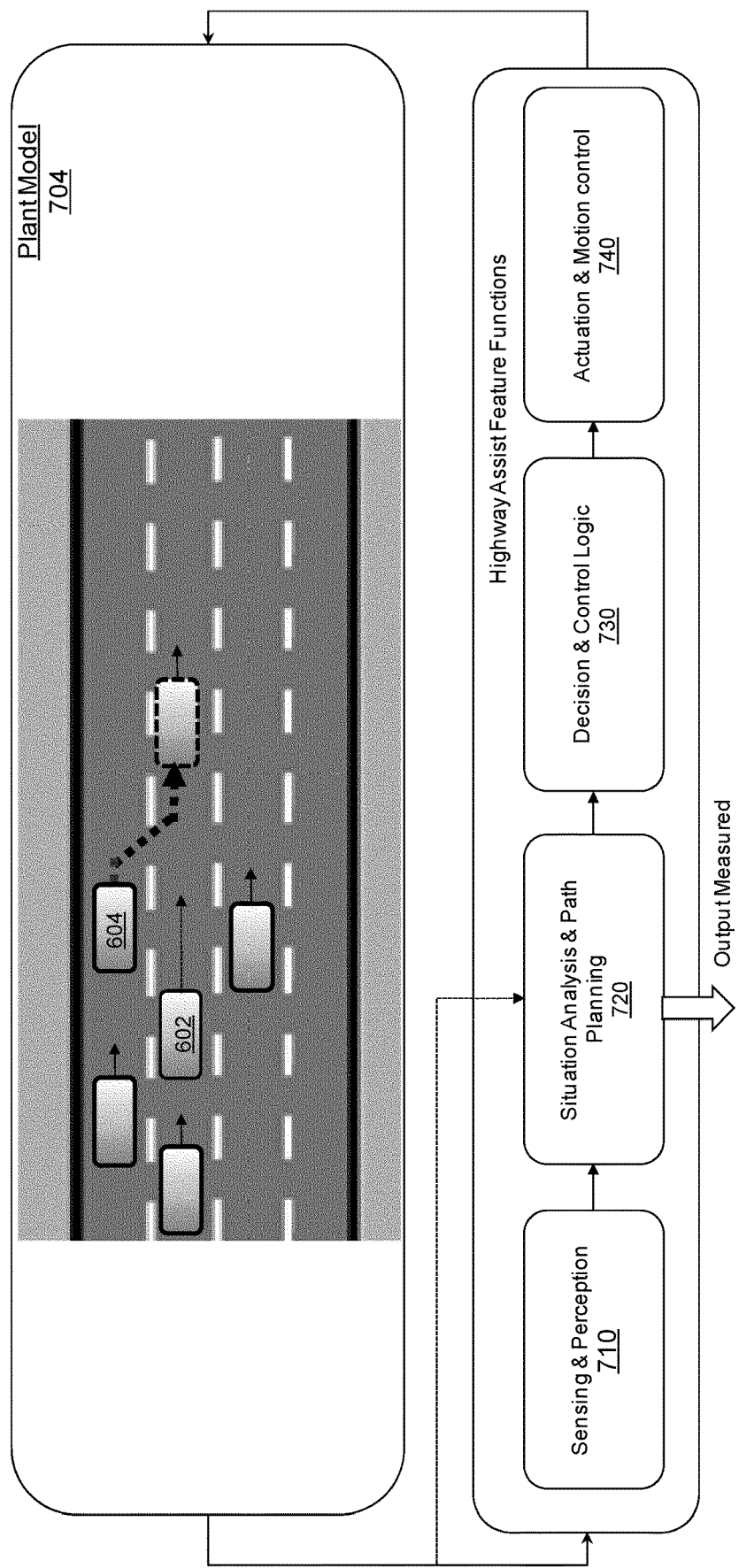
FIG. 7B illustrates exemplary view depicting situation analysis and planning test bench and flow of data amongst plant model and situation analysis and planning test bench in accordance with an implementation of the present disclosure.

FIG. 7B illustrates exemplary view depicting situation analysis and planning test bench and flow of data amongst plant model and situation analysis and planning test bench in accordance with an implementation of the present disclosure. In an aspect, plant model 704 includes, but not limited to, data corresponding to subject vehicle speed, cut-in objects at different speeds/manoeuvres, insertions of threat objects, insertion of loss of parameter values (e.g. lane attribute) for determined times and the like, which data is sent to situation analysis and planning test bench 720 apart from data obtained from sensing and perception test bench 710 to execute validation and measure response in target object selection, response to predict target movement (front object becoming side object), safe path and distance estimates to targets and the like (shown as measurement of output in FIG. 7B). The validation measurands corresponding to situation analysis and planning test bench 720 are subject vehicle speed range, subject vehicle time headway, subject vehicle manoeuvre coordination, driver location, driver monitoring and driver activation.

Figure 7C:
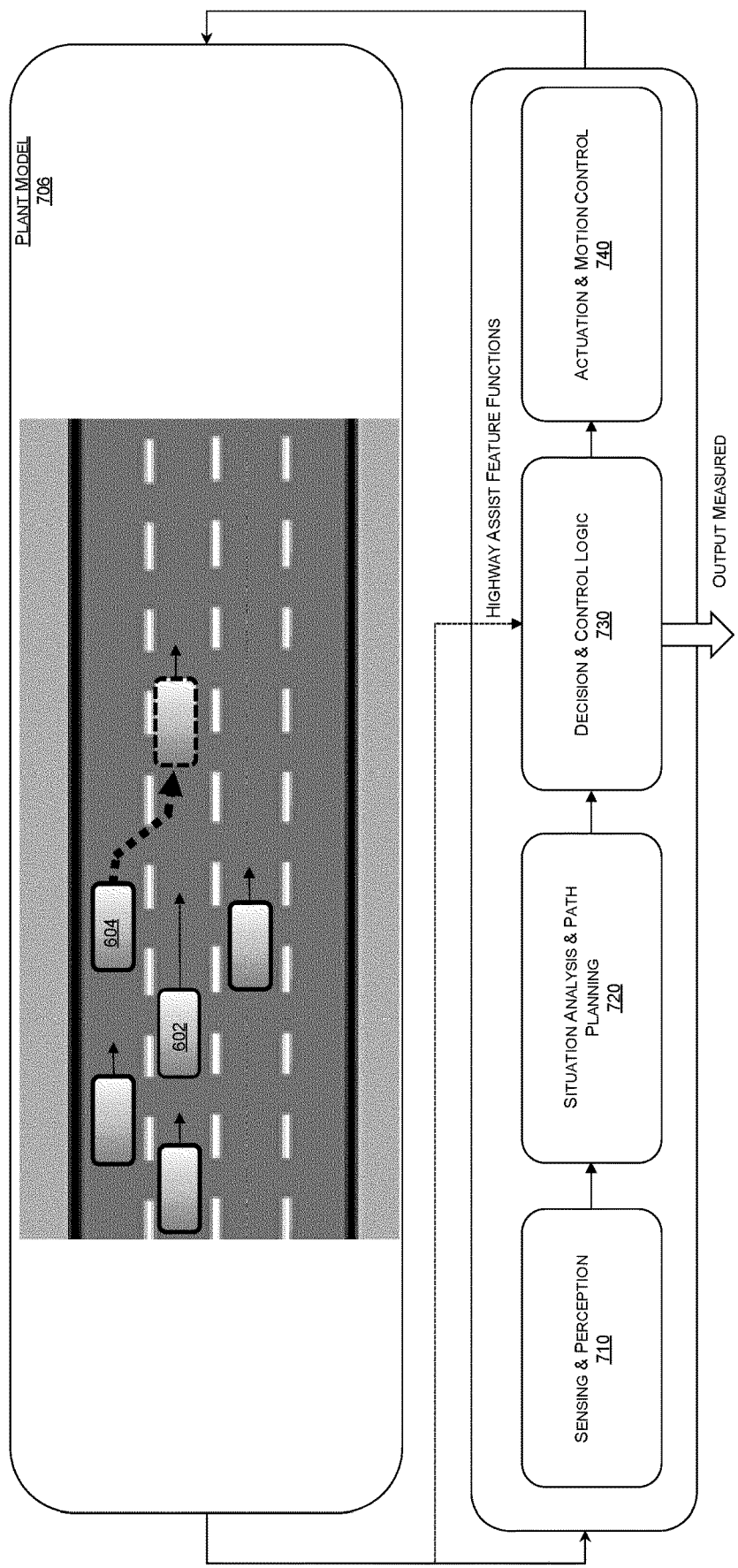
FIG. 7C illustrates exemplary view depicting decision and logic building test bench and flow of data amongst plant model and decision and logic building test bench in accordance with an implementation of the present disclosure.

FIG. 7C illustrates exemplary view depicting decision and logic building test bench and flow of data amongst plant model and decision and logic building test bench in accordance with an implementation of the present disclosure. In an aspect, plant model 706 includes, but not limited to, data corresponding to target of interest (TOI) and all parameters, variation in cut-in objects at different velocities, inserted threats and overrides, varying subject vehicle speeds and the like, which data is sent to decision and control logic building test bench 730 to execute validation and measure decision for feature to command, feature activation/deactivation status, override conditions and the like (shown as measurement of output in FIG. 7C). The validation measurands corresponding to decision and logic building test bench 730 are subject vehicle speed range, subject vehicle time headway, subject vehicle manoeuvre coordination, subject vehicle trigger, driver qualification, and driver location.

Figure 7D:
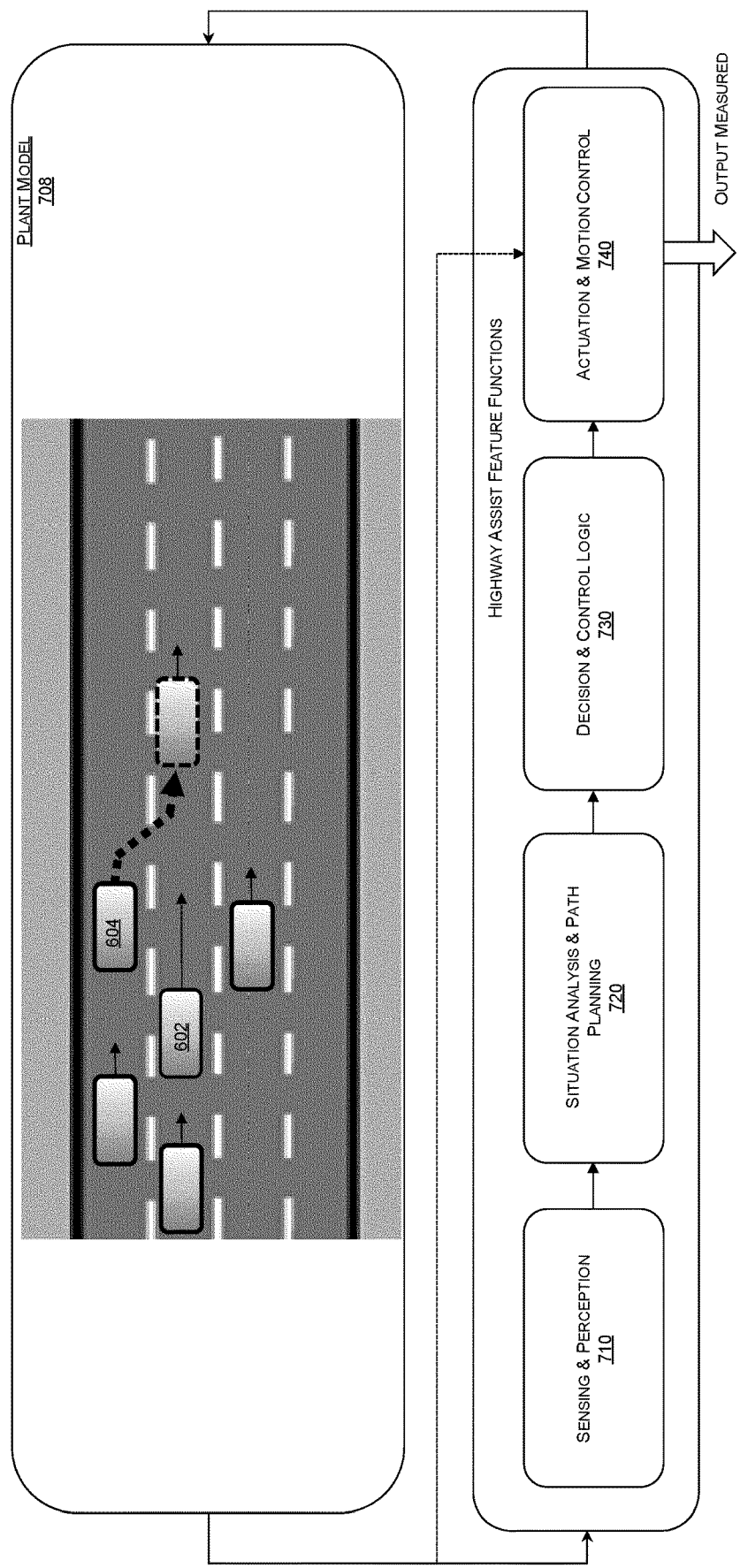
FIG. 7D illustrates exemplary view depicting actuation and motion control test bench and flow of data amongst plant model and actuation and motion control test bench in accordance with an implementation of the present disclosure.

FIG. 7D illustrates exemplary view depicting actuation and motion control test bench and flow of data amongst plant model and actuation and motion control test bench in accordance with an implementation of the present disclosure. In an aspect, plant model 708 includes, but not limited to, data corresponding to varying predicted path inputs, varying object parameter values for target vehicle (acceleration/deceleration), loss of parameter at defined intervals and the like, which data is sent to actuation and motion control test bench 740 to execute validation and to measure steering rates (torque/angle) and values commanded, maintenance of safe distance, braking command values and rates, and the like (shown as measurement of output in FIG. 7D). The validation measurands corresponding to actuation and motion control test bench 740 are subject vehicle control force, subject vehicle speed range, subject vehicle manoeuvre coordination and subject vehicle trigger.

Figure 8:
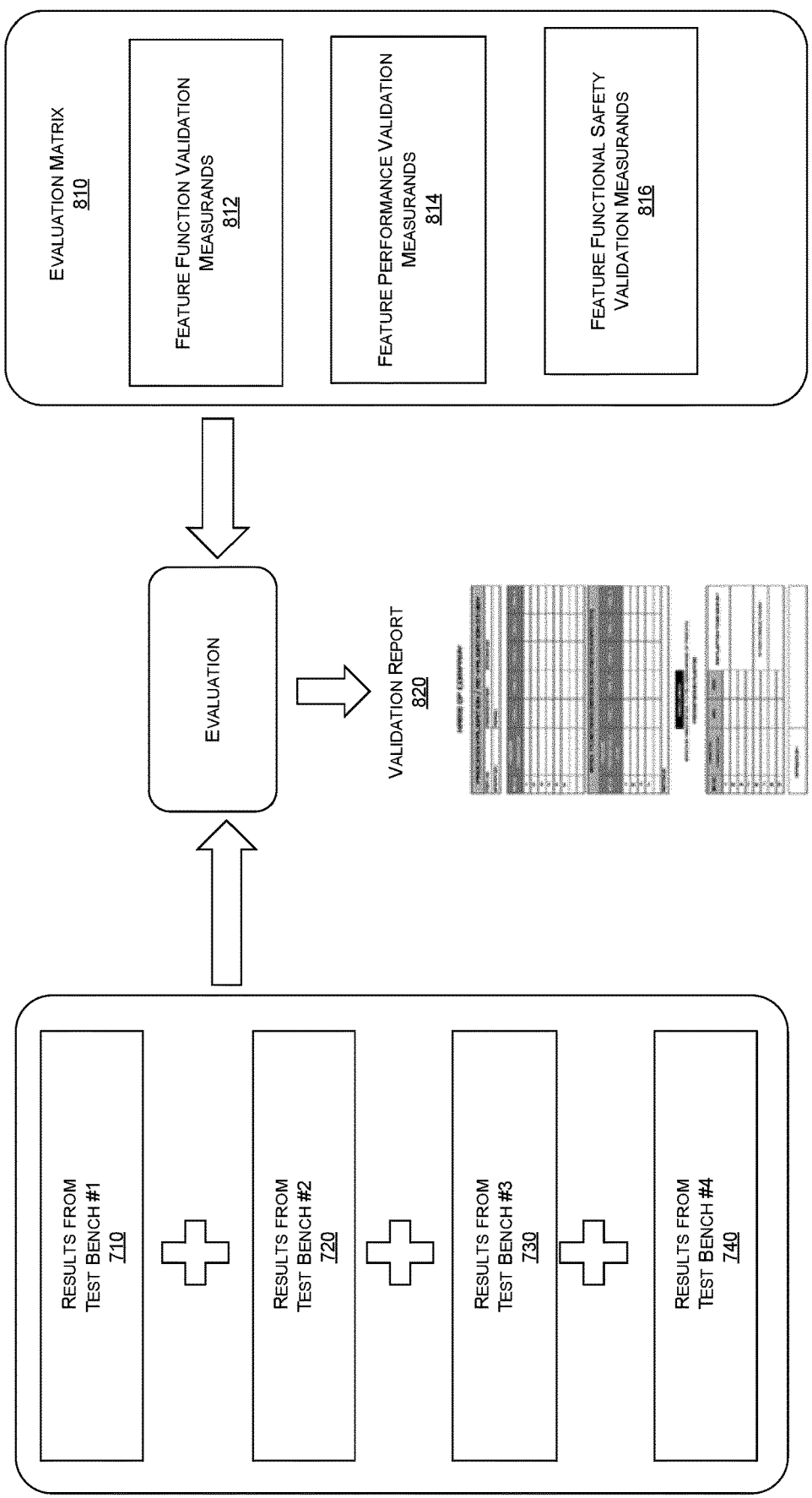
FIG. 8 illustrates an exemplary view depicting generation of validation report in accordance with an implementation of the present disclosure.

FIG. 8 illustrates an exemplary view depicting generation of validation report in accordance with an implementation of the present disclosure. As illustrated, validation report 820 is generated based on evaluation of (i) results from test benches 710, 720, 730 and 740 i.e. quantitative validation of each of the plurality of functional areas of the automation feature and (ii) evaluation matrix 810 based on any or a combination of automation feature function validation measurand(s) 812, automation feature performance validation measurand(s) 814, and automation feature safety validation measurand(s) 816.

Figure 9A:
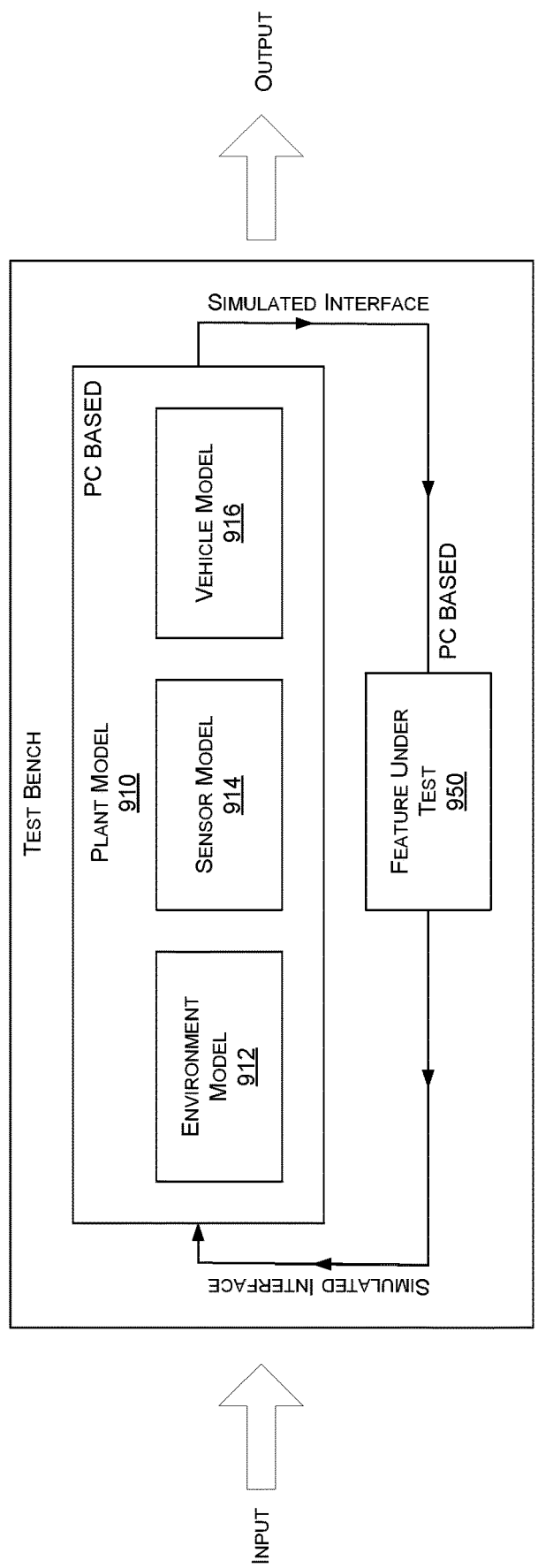
FIG. 9A illustrates an exemplary view depicting a general set-up for a test bench for non-real time validation of automation feature in accordance with an implementation of the present disclosure.

FIG. 9A illustrates an exemplary view depicting a general set-up for a test bench for non-real time validation of automation feature in accordance with an implementation of the present disclosure. As illustrated, the test bench includes a plant model 910 and a simulation model of feature under test (validation) 950, wherein plant model 910 includes an environment model 912, a sensor model 914 and a vehicle model 916. However, inclusion of any other model(s) is completely within the scope of the present disclosure without departing from scope and spirit of the present invention. The plant model 910 and the simulation model for feature under test 950 are connected through an interface. The interface between the plant model and the simulated model for feature under test can be in the form of simulated signals. In an implementation, the test bench for non-real time validation of automation feature has the capability to provide functional and safety coverage. In an implementation, a plurality of inputs, depending on functional area to be validated, is provided to the test bench for execution of validation of one or more functional area(s) of the automation feature.

Figure 9B:
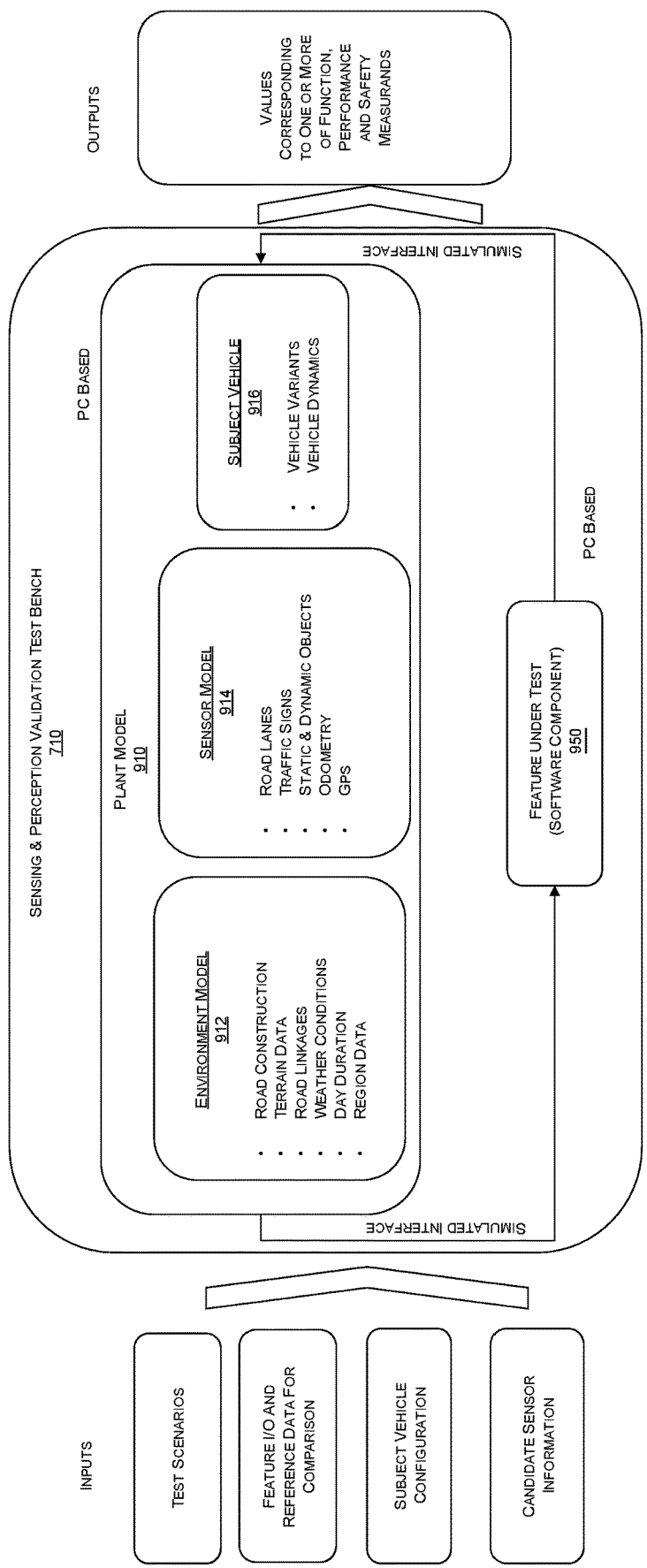
FIG. 9B illustrates an exemplary view depicting set-up of the sensing and perception validation test bench 710 for execution of non-real time validation in accordance with an implementation of the present disclosure.

FIG. 9B illustrates an exemplary view depicting set-up of the sensing and perception validation test bench 710 for execution of non-real time validation in accordance with an implementation of the present disclosure. As illustrated, the sensing and perception validation test bench 710 for execution of non-real time validation includes a plant model 910 and a simulated model for feature under test 950 connected through a simulated interface, wherein the plant model 910 includes an environment model 912, a sensor model 914 and a vehicle model 916. The environment model 910 includes, but not limited to, data corresponding to road construction, terrain data, road linkages, weather conditions, day duration, region data and the like. The sensor model 914 includes, but not limited to, data corresponding to road lanes, traffic signs, static and dynamic objects, odometry, GPS and the like. The vehicle model 916 includes, but not limited to, data corresponding to vehicle variants, vehicle dynamics and the like. A plurality of information including, but not limited to, test scenario, feature I/O and reference data for comparison, subject vehicle configuration, candidate sensor information and the like is provided as input to the sensing and perception validation test bench 710, which upon execution of validation, output values corresponding one or more of performance, function and safety measurands for the sensing and perception validation functional area. In an implementation, any or a combination of CARSIM, CAR Maker and Motion Desk, but not limited thereto, can be utilized for environment model. In an implementation, any or a combination of CARSIM, CAR Maker, Motion Desk, MATLAB, but not limited thereto, can be utilized for sensor model. In an implementation, any or a combination of CARSIM, CAR Maker, MATLAB, Motion Desk, but not limited thereto, can be utilized for subject vehicle model. In an implementation, any or a combination of MATLAB/Simulink Models, MATLAB S-Functions, C Functions, but not limited thereto, can be used for simulation model for feature under test. In an implementation, simulated interface signals or buses, but not limited thereto, can be used for interface.

Figure 9C:
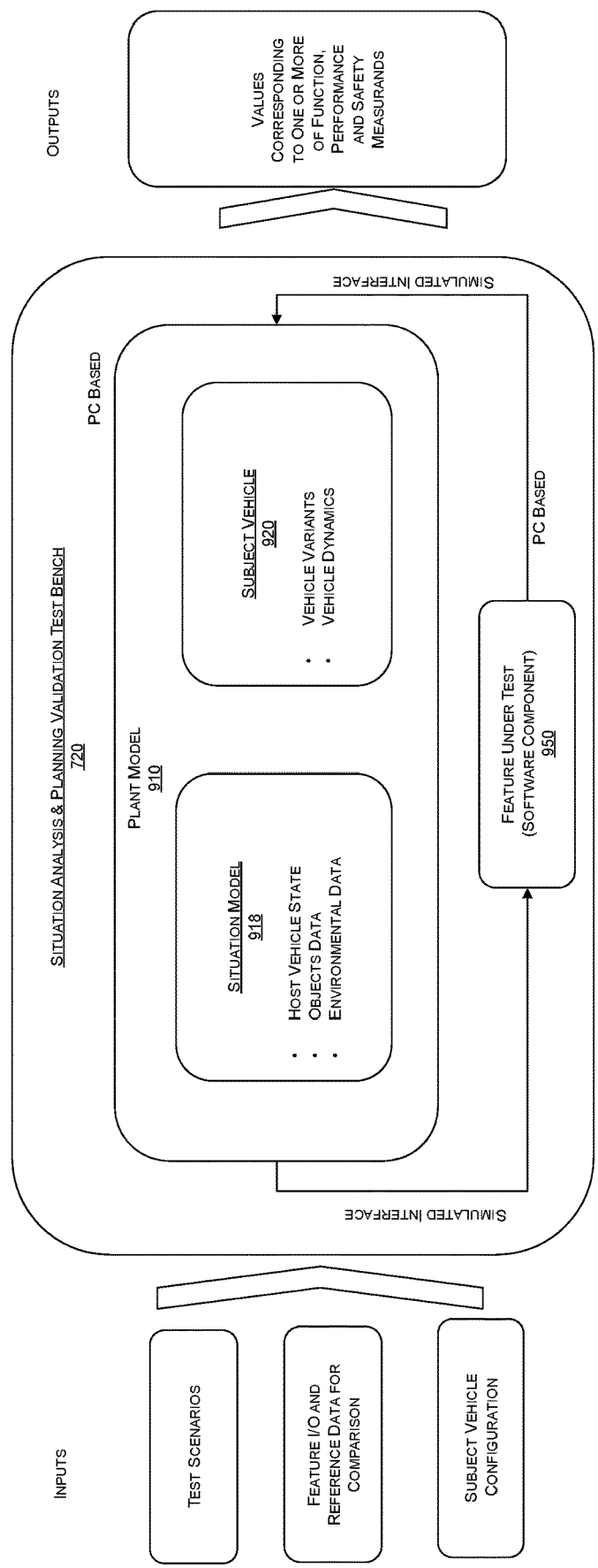
FIG. 9C illustrates an exemplary view depicting set-up of the situation and planning validation test bench 720 for execution of non-real time validation in accordance with an implementation of the present disclosure.

FIG. 9C illustrates an exemplary view depicting set-up of the situation and planning validation test bench 720 for execution of non-real time validation in accordance with an implementation of the present disclosure. As illustrated, the situation and planning validation test bench 720 for execution of non-real time validation includes a plant model 910 and a simulated model for feature under test 950 connected through a simulated interface, wherein the plant model 910 includes a situation model 918 and a subject vehicle model 920. The situation model 918 includes, but not limited to, data corresponding to host vehicle state, objects data, environmental data and the like. The subject vehicle model 920 includes, but not limited to, data corresponding to vehicle variants, vehicle dynamics and the like. A plurality of information, including but not limited to, test scenario, feature I/O and reference data for comparison, subject vehicle configuration and the like is provided as input to the situation and planning validation test bench 720, which upon execution of validation, output values corresponding one or more of performance, function and safety measurands for the situation and planning functional area. In an implementation, any or a combination of CARSIM, CAR Maker, Motion Desk, but not limited thereto, can be utilized for situation model. In an implementation, any or a combination of CARSIM, CAR Maker, Motion Desk, but not limited thereto, can be utilized for subject vehicle model. In an implementation, any or a combination of MATLAB/Simulink Models, MATLAB S-Functions, C Functions, but not limited thereto, can be used for simulation model for feature under test. Simulated interface signals or buses, but not limited thereto, can be used for interface.

Figure 9D:
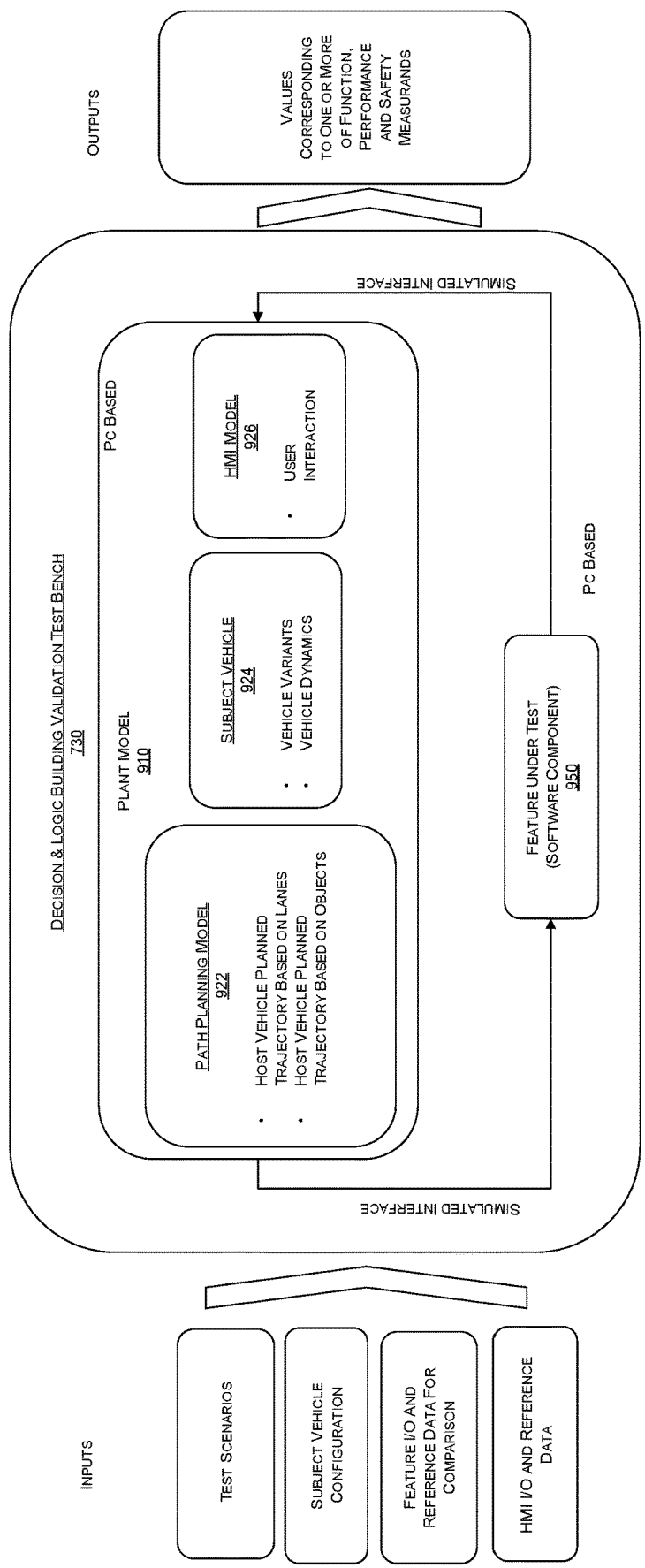
FIG. 9D illustrates an exemplary view depicting set-up of the decision and logic building validation test bench 730 for execution of non-real time validation in accordance with an implementation of the present disclosure.

FIG. 9D illustrates an exemplary view depicting set-up of the decision and logic building validation test bench 730 for execution of non-real time validation in accordance with an implementation of the present disclosure. As illustrated, the decision and logic building validation test bench 730 for execution of non-real time validation includes a plant model 910 and a simulated model for feature under test 950 connected through a simulated interface, wherein the plant model 910 includes a path planning model 922, a subject vehicle model 924 and a HMI model 926. The path planning model 922 includes, but not limited to, data corresponding to host vehicle planned trajectory based on lanes, host vehicle planned trajectory based objects and the like. The subject vehicle model 924 includes, but not limited to, data corresponding to vehicle variants, vehicle dynamics and the like. The HMI model 926 includes, but not limited to, data corresponding to user interaction and the like. A plurality of information, including but not limited to, test scenario, feature I/O and reference data for comparison, subject vehicle configuration, HMI I/O and reference data for comparison and the like is provided as input to the decision and logic building validation test bench 730, which upon execution of validation, output values corresponding one or more of performance, function and safety measurands for the decision and logic building functional area. In an implementation, any or a combination of CARSIM, CAR Maker, Motion Desk, but not limited thereto, can be utilized for path planning model. In an implementation, any or a combination of CARSIM, CAR Maker, MATLAB, but not limited thereto, can be utilized for HMI setup. In an implementation, any or a combination of CARSIM, CAR Maker, MATLAB, Motion Desk, but not limited thereto, can be utilized for subject vehicle model. In an implementation, any or a combination of MATLAB/Simulink Models, MATLAB S-Functions, C Functions, but not limited thereto, can be used for simulation model for feature under test. In an implementation, simulated interface signals or buses, but not limited thereto, can be used for interface.

Figure 9E:
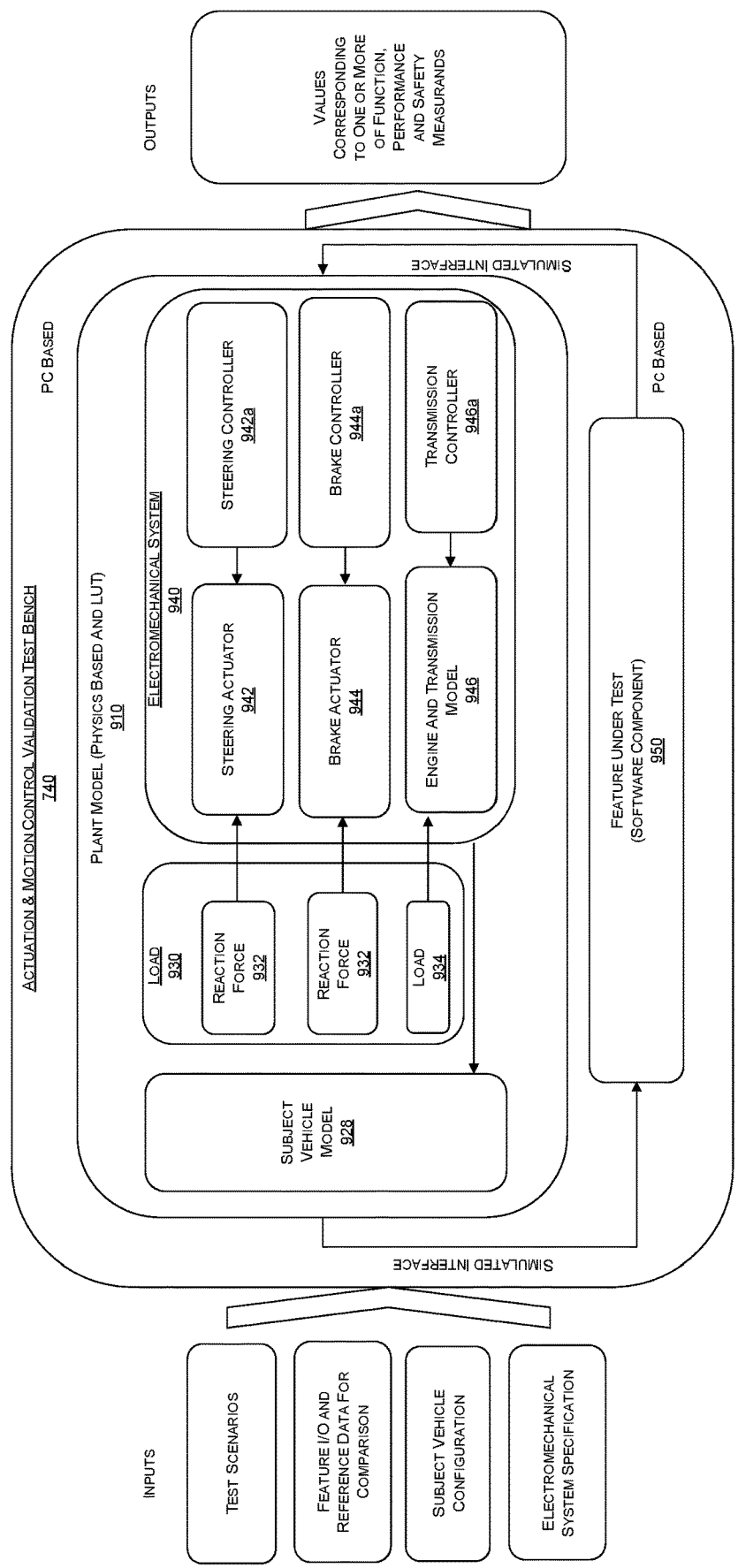
FIG. 9E illustrates an exemplary view depicting set-up of the actuation and motion control validation test bench 740 for execution of non-real time validation in accordance with an implementation of the present disclosure.

FIG. 9E illustrates an exemplary view depicting set-up of the actuation and motion control validation test bench 740 for execution of non-real time validation in accordance with an implementation of the present disclosure. As illustrated, the actuation and motion control validation test bench 740 for execution of non-real time validation includes a plant model 910 and a simulated model for feature under test 950 connected through a simulated interface, wherein the plant model 910 includes a subject vehicle model 928, a model for load 930 and a model for electromechanical system 940. The model for load 930 further includes, but not limited to, data corresponding to reaction force 932, load 934 and the like. The model for the electromechanical system 940 includes, but not limited to, data corresponding to steering actuator 942 and steering controller 942a, brake actuator 944 and brake controller 944a and engine and transmission model 946 and transmission controller 946a. A plurality of information, including but not limited to, test scenario, feature I/O and reference data for comparison, subject vehicle configuration, electromechanical system specification and the like is provided as input to the actuation and motion control validation test bench 740, which upon execution of validation, output values corresponding one or more of performance, function and safety measurands for the actuation and motion control functional area. In an implementation, any or a combination of CARSIM, CAR Maker, Motion Desk, SimuLink, but not limited thereto, can be utilized for subject vehicle model. In an implementation, any or a combination of CARSIM, CAR Maker, Motion Desk, SimLink, but not limited thereto, can be utilized for electromechanical system. In an implementation, any or a combination of MATLAB/Simulink Models, Legacy C/C++ Code, CMEX S-Function, but not limited thereto, can be used for simulation model for feature under test. Any or a combination of MATLAB, SimuLink, Signal Builder, Simulink Vector Toolbox, but not limited thereto, can be used for interface.

Figure 10A:
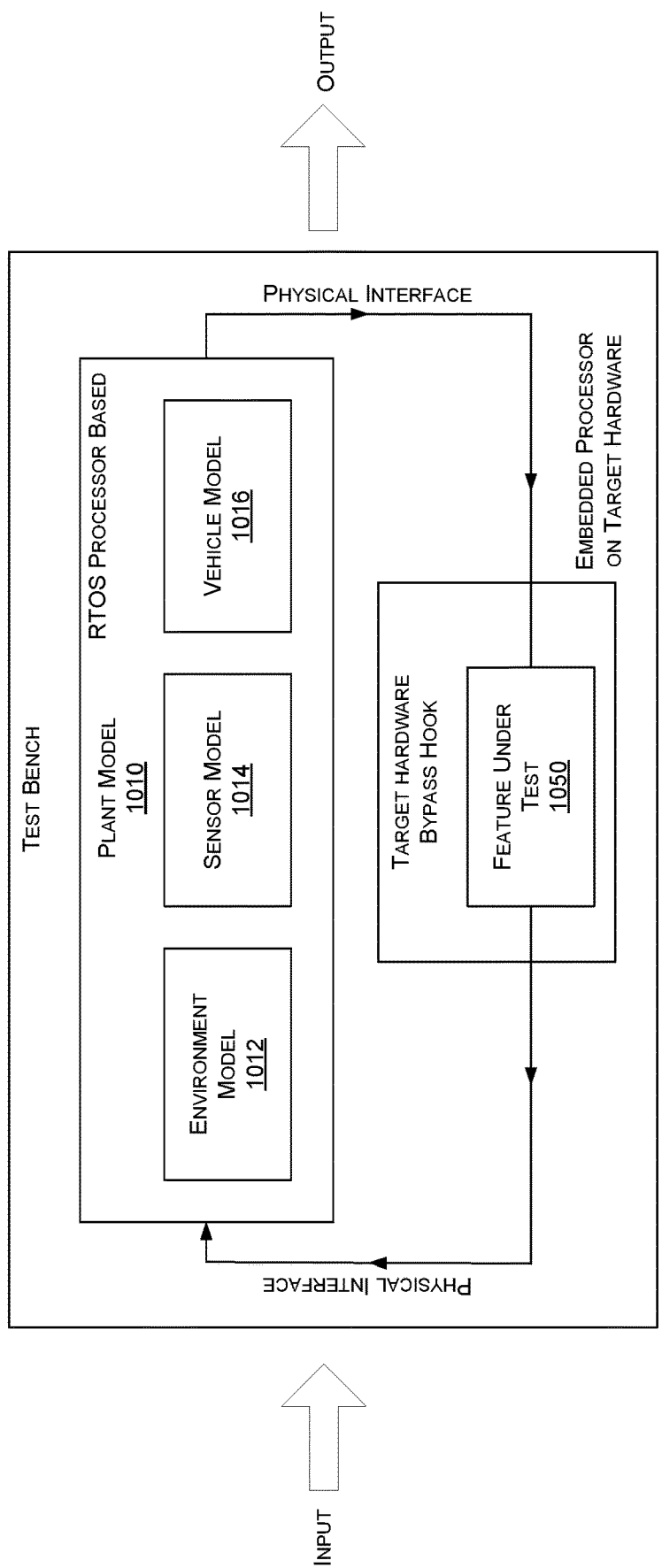
FIG. 10A illustrates an exemplary view depicting a general set-up for a test bench for real time validation of automation feature in accordance with an implementation of the present disclosure.

FIG. 10A illustrates an exemplary view depicting a general set-up for a test bench for real time validation of automation feature in accordance with an implementation of the present disclosure. As illustrated, the test bench includes a plant model 1010 and a simulation model of feature under test (validation) 1050, wherein the plant model 1010 includes an environment model 1012, a sensor model 1014 and a vehicle model 1016. The plant model 1010 and the simulation model for feature under test 1050 are connected through an interface. In an implementation, the interface is a physical interface. In an implementation, the interface between the plant model and the simulated model for feature under test is in the form of real interface containing physical signals and transmission protocols. In an implementation, bypass hooks/entry points configuring a specific functionality of the automation feature are provided for the automation feature under test 1050. In an implementation, the test bench for real time validation of automation feature has the capability to provide functional, safety and performance coverage. In an implementation, feature under test is executed by an integration of hardware and software. The hardware can be any or a combination of embedded processors/microcontrollers, but not limited thereto, which can vary in terms of attributes such as clock frequency, RAM size, data bus width and I/O voltage. Further, the software can be a real time data processing software such as real time operating system (RTOS), but not limited thereto.

Figure 10B:
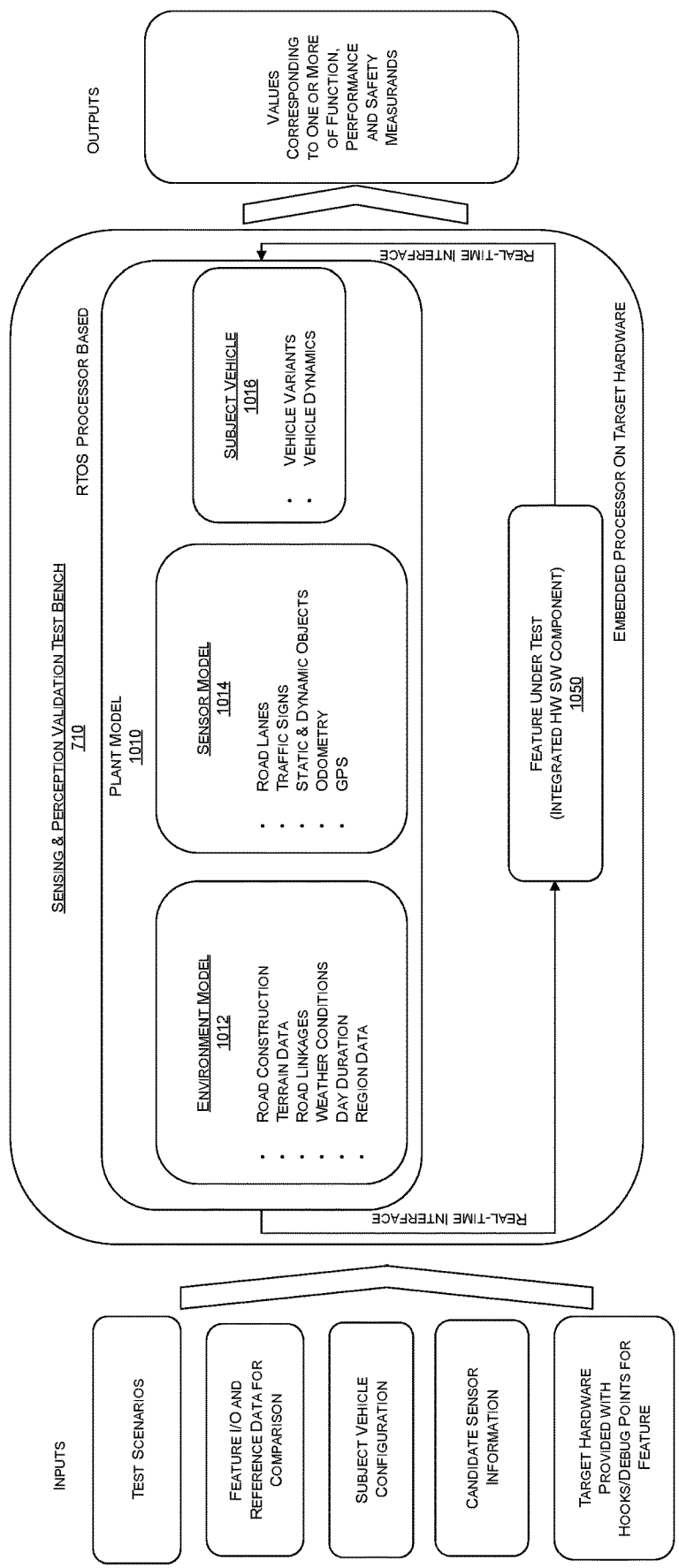
FIG. 10B illustrates an exemplary view depicting set-up of the sensing and perception validation test bench 710 for execution of real time validation in accordance with an implementation of the present disclosure.

FIG. 10B illustrates an exemplary view depicting set-up of the sensing and perception validation test bench 710 for execution of real time validation in accordance with an implementation of the present disclosure. As illustrated, the sensing and perception validation test bench 710 for execution of real time validation includes a plant model 1010 and a simulated model for feature under test 1050 connected through a physical (real-time) interface, wherein the plant model 1010 includes an environment model 1012, a sensor model 1014 and a subject vehicle model 1016. The environment model 1010 includes, but not limited to, data corresponding to road construction, terrain data, road linkages, weather conditions, day duration, region data and the like. The sensor model 1014 includes, but not limited to, data corresponding to road lanes, traffic signs, static and dynamic objects, odometry, GPS and the like. The vehicle model 1016 includes, but not limited to, data corresponding to vehicle variants, vehicle dynamics and the like. A plurality of information, including but not limited to, test scenario, feature I/O and reference data for comparison, subject vehicle configuration, candidate sensor information, target hardware provided with hooks/debug points for feature and the like is provided as input to the sensing and perception validation test bench 710, which upon execution of validation, can output values corresponding one or more of performance, function and safety measurands for the sensing and perception validation functional area. In an implementation, any or a combination of CARSIM, CAR Maker, Motion Desk, but not limited thereto, can be utilized as software(s) for environment model. In an implementation, any or a combination of RTW, eRT, TargetLink, but not limited thereto, can be utilized as deployment tool(s) for environment model. In an implementation, any or a combination of dSpace, OpalRTm RT, IPG Rigs, xPC Target, but not limited thereto, can be utilized as hardware(s) for environment model. In an implementation, any or a combination of RT-Linux, QNX, but not limited thereto, can be utilized as operating system for environment model. In an implementation, any or a combination of CARSIM, CAR Maker, MATLAB, but not limited thereto, can be utilized as software(s) for sensor model. In an implementation, any or a combination of RTW, eRT, TargetLink, but not limited thereto, can be utilized as deployment tool(s) for sensor model. In an implementation, any or a combination of dSpace Rigs, OpalRT, IPG Rigs, xPC Target, but not limited thereto, can be utilized as hardware(s) for sensor model. In an implementation, any or a combination of RT-Linux, QNX, but not limited thereto, can be utilized as operating system for sensor model. In an implementation, any or a combination of CARSIM, CAR Maker, MATLAB, but not limited thereto, can be utilized as software(s) for subject vehicle model. In an implementation, any or a combination of RTW, eRT, TargetLink, but not limited thereto, can be utilized as deployment tool(s) for subject vehicle model. In an implementation, any or a combination of dSpace Rigs, OpalRT, IPG Rigs, xPC Target, but not limited thereto, can be utilized as hardware(s) for subject vehicle model. In an implementation, any or a combination of RT-Linux, QNX, but not limited thereto, can be utilized as operating system for subject vehicle model. In an implementation, any or a combination of EHOOKS (ETAS Hooks), RTW, eRT, TargetLink, but not limited thereto, can be used as deployment tool(s) for a simulation model for feature under test. In an implementation, any or a combination of ADAS and AD Processors, dSpace, OpalRT, but not limited thereto, can be used as hardware(s) for a simulation model for feature under test. In an implementation, any or a combination of CANoe, CANALYZER and Keil, but not limited thereto, can be used for interface.

Figure 10C:
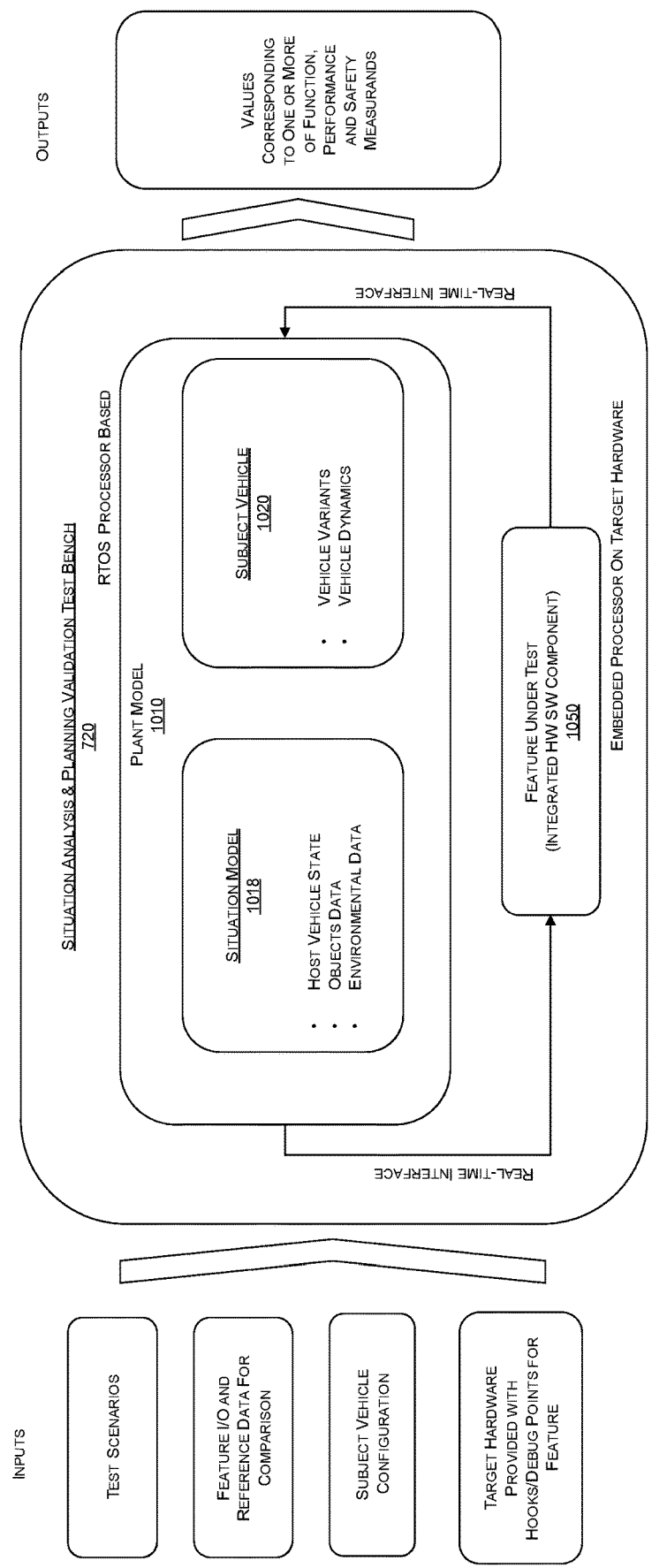
FIG. 10C illustrates an exemplary view depicting set-up of the situation and planning validation test bench 720 for execution of real time validation in accordance with an implementation of the present disclosure.

FIG. 10C illustrates an exemplary view depicting set-up of the situation and planning validation test bench 720 for execution of real time validation in accordance with an implementation of the present disclosure. As illustrated, the situation and planning validation test bench 720 for execution of real time validation includes a plant model 1010 and a simulated model for feature under test 1050 connected through a physical (real-time) interface, wherein the plant model 1010 includes a situation model 1018 and a subject vehicle model 1020. The situation model 1018 includes, but not limited to, data corresponding to host vehicle state, objects data, environmental data and the like. The subject vehicle model 1020 includes, but not limited to, data corresponding to vehicle variants, vehicle dynamics and the like. A plurality of information, including but not limited to, test scenario, feature I/O and reference data for comparison, subject vehicle configuration, target hardware provided with hooks/debug points for feature and the like is provided as input to the situation and planning validation test bench 720, which upon execution of validation, output values corresponding to one or more of performance, function and safety measurands for the situation and planning functional area. In an implementation, any or a combination of CARSIM, CAR Maker, Motion Desk, but not limited thereto, can be utilized as software(s) for situation model. In an implementation, any or a combination of RTW, eRT, TargetLink, but not limited thereto, can be utilized as deployment tool(s) for situation model. In an implementation, any or a combination of dSpace, OpalRTm RT, IPG Rigs, xPC Target, but not limited thereto, can be utilized as hardware(s) for situation model. In an implementation, any or a combination of RT-Linux, QNX, but not limited thereto, can be utilized as operating system for situation model. In an implementation, any or a combination of CARSIM, CAR Maker, MATLAB, but not limited thereto, can be utilized as software(s) for subject vehicle model. In an implementation, any or a combination of RTW, eRT, TargetLink, but not limited thereto, can be utilized as deployment tool(s) for subject vehicle model. In an implementation, any or a combination of dSpace Rigs, OpalRT, IPG Rigs, xPC Target, but not limited thereto, can be utilized as hardware(s) for subject vehicle model. In an implementation, any or a combination of RT-Linux, QNX, but not limited thereto, can be utilized as operating system for subject vehicle model. In an implementation, any or a combination of EHOOKS(ETAS Hooks), RTW, eRT, TargetLink, but not limited thereto, can be used as deployment tool(s) for a simulation model for feature under test. In an implementation, any or a combination of ADAS and AD Processors, dSpace, OpalRT, but not limited thereto, can be used as hardware(s) for a simulation model for feature under test. In an implementation, any or a combination of CANoe, CANALYZER, Keil, but not limited thereto, can be used for interface.

Figure 10D:
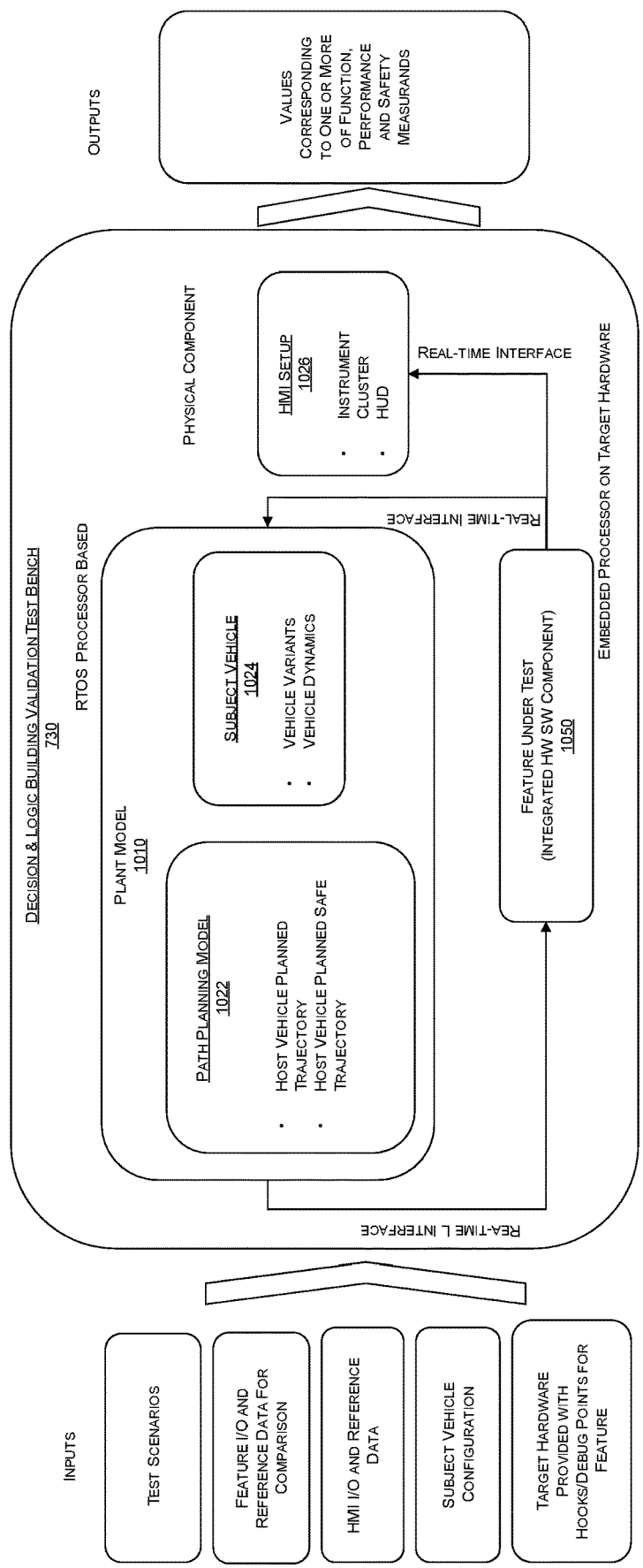
FIG. 10D illustrates an exemplary view depicting set-up of the decision and logic building validation test bench 730 for execution of real time validation in accordance with an implementation of the present disclosure.

FIG. 10D illustrates an exemplary view depicting set-up of the decision and logic building validation test bench 730 for execution of real time validation in accordance with an implementation of the present disclosure. As illustrated, the decision and logic building validation test bench 730 for execution of real time validation includes a plant model 1010, a simulated model for feature under test 1050 and HMI setup 1026 (physical component) connected through a real time interface, wherein the plant model 1010 includes a path planning model 1022 and a subject vehicle model 1024. The path planning model 1022 includes, but not limited to, data corresponding to host vehicle planned trajectory based on lanes, host vehicle planned trajectory based objects and the like. The subject vehicle model 1024 includes, but not limited to, data corresponding to vehicle variants, vehicle dynamics and the like. The HMI setup 1026 includes, but not limited to, data corresponding to instrument cluster, HUD and the like. A plurality of information, including but not limited to, test scenario, feature I/O and reference data for comparison, subject vehicle configuration, HMI I/O and reference data for comparison, target hardware provided with hooks/debug points for feature and the like is provided as input to the decision and logic building validation test bench 730, which upon execution of validation, output values corresponding one or more of performance, function and safety measurands for the decision and logic building functional area. In an implementation, any or a combination of CARSIM, CAR Maker, Motion Desk, but not limited thereto, can be utilized as software(s) for path planning model. In an implementation, any or a combination of RTW, eRT, TargetLink, but not limited thereto, can be utilized as deployment tool(s) for path planning model. In an implementation, any or a combination of dSpace, OpalRTm RT, IPG Rigs, xPC Target, but not limited thereto, can be utilized as hardware(s) for path planning model. In an implementation, any or a combination of RT-Linux, QNX, but not limited thereto, can be utilized as operating system for path planning model. In an implementation, one or a combination of CARSIM, CAR Maker, MATLAB, but not limited thereto, can be utilized as software(s) for subject vehicle model. In an implementation, one or a combination of RTW, eRT, TargetLink, but not limited thereto, can be utilized as deployment tool(s) for subject vehicle model. In an implementation, one or a combination of dSpace Rigs, OpalRT, IPG Rigs, xPC Target, but not limited thereto, can be utilized as hardware(s) for subject vehicle model. In an implementation, one or a combination of RT-Linux, QNX, but not limited thereto, can be utilized as operating system for subject vehicle model. In an implementation, representative instrument cluster, HUD, but not limited thereto, can be used as hardware(s) for HMI setup. In an implementation, one or a combination of EHOOKS (ETAS Hooks), RTW, eRT, TargetLink, but not limited thereto, can be used as deployment tool(s) for a simulation model for feature under test. In an implementation, one or a combination of ADAS and AD Processors, dSpace, OpalRT, but not limited thereto, can be used as hardware(s) for a simulation model for feature under test. In an implementation, one or a combination of CANoe, CANALYZER, Keil, Wire harness, but not limited thereto, can be used for interface.

Figure 10E:
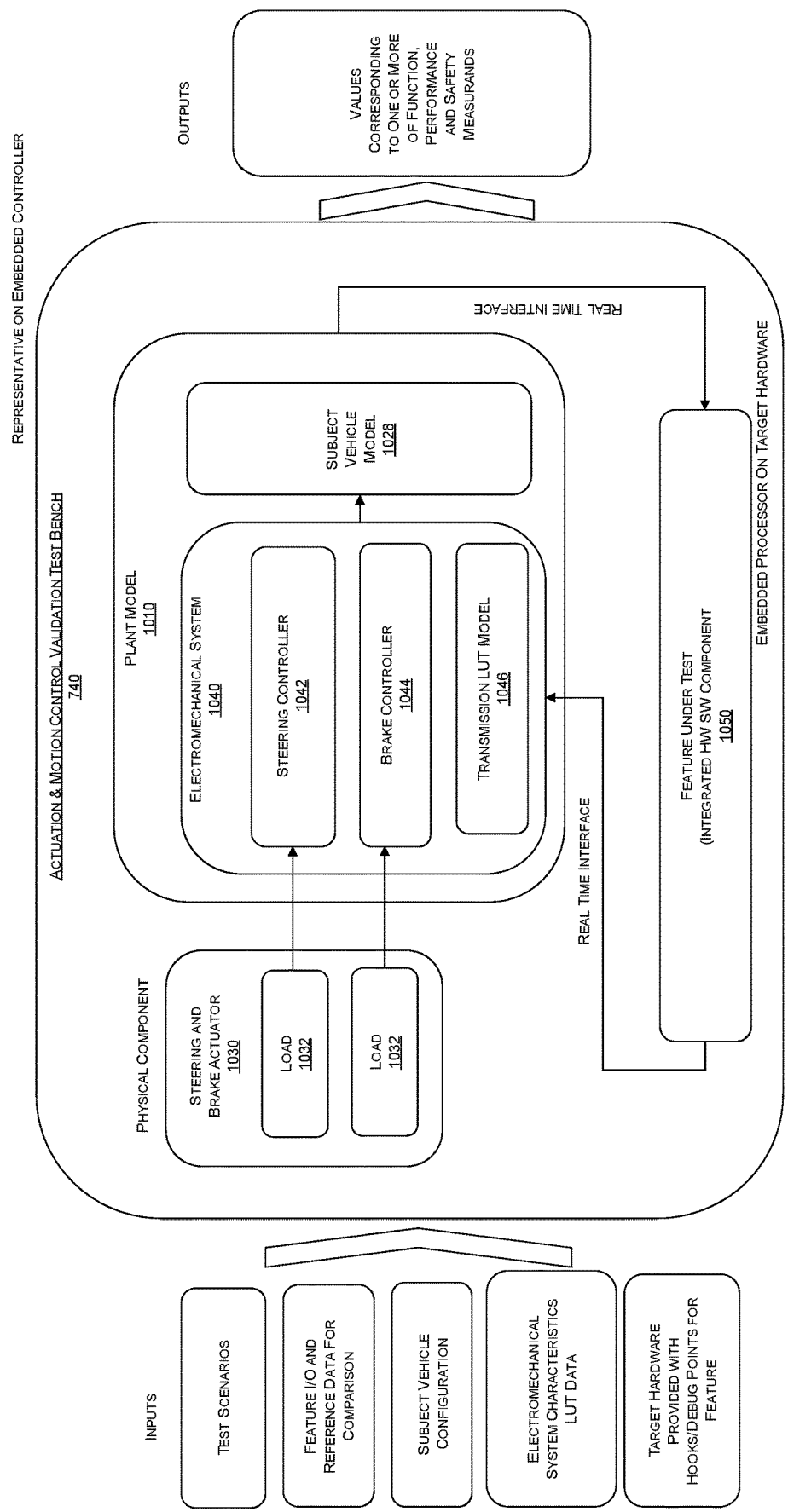
FIG. 10E illustrates an exemplary view depicting set-up of the actuation and motion control validation test bench 740 for execution of non-real time validation in accordance with an implementation of the present disclosure.

FIG. 10E illustrates an exemplary view depicting set-up of the actuation and motion control validation test bench 740 for execution of non-real time validation in accordance with an implementation of the present disclosure. As illustrated, the actuation and motion control validation test bench 740 for execution of real time validation includes a plant model 1010, a simulated model for feature under test 1050 and Steering and brake actuator (physical component) 1030 connected through a real time (physical) interface, wherein the plant model 1010 includes a subject vehicle model 1028, a model for electromechanical system 1040. The model for the electromechanical system 1040 includes, but not limited to, data corresponding to steering controller 1042, brake controller 1044 and transmission LUT model 1046. The steering and brake actuator 1030 includes, but not limited to, data corresponding to load 1032. A plurality of information, including but not limited to, test scenario, feature I/O and reference data for comparison, subject vehicle configuration, electromechanical system specification and the like is provided as input to the actuation and motion control validation test bench 740, which upon execution of validation, output values corresponding one or more of performance, function and safety measurands for the actuation and motion control functional area. In an implementation, one or a combination of CARSIM, CAR Maker, Motion Desk, SimuLink, but not limited thereto, can be utilized as software(s) for electromechanical model. In an implementation, one or a combination of RTW, eRT, TargetLink, but not limited thereto, can be utilized as deployment tool(s) for electromechanical model. In an implementation, one or a combination of dSpace, OpalRTm RT, IPG Rigs, xPC Target, ECU, but not limited thereto, can be utilized as hardware(s) for electromechanical model. In an implementation, one or a combination of RT-Linux, QNX, but not limited thereto, can be utilized as operating system for electromechanical model. In an implementation, steer actuator assembly and brake actuator assembly, but not limited thereto, can be used as electromechanical components. In an implementation, one or a combination of CARSIM, CAR Maker, Motion Desk, but not limited thereto, can be utilized as software(s) for subject vehicle model. In an implementation, one or a combination of RTW, eRT, TargetLink, but not limited thereto, can be utilized as deployment tool(s) for subject vehicle model. In an implementation, one or a combination of dSpace Rigs, OpalRT, IPG Rigs, xPC Target, but not limited thereto, can be utilized as hardware(s) for subject vehicle model. In an implementation, one or a combination of RT-Linux, QNX, but not limited thereto, can be utilized as operating system for subject vehicle model. In an implementation, one or a combination of EHOOKS (ETAS Hooks), RTW, eRT, TargetLink, but not limited thereto, can be used as deployment tool(s) for a simulation model for feature under test. In an implementation, one or a combination of ADAS and AD Processors, dSpace, OpalRT, but not limited thereto, can be used as hardware(s) for a simulation model for feature under test. In an implementation, one or a combination of CANoe, CANALYZER, but not limited thereto, can be used as software(s) for interface. In an implementation, one or a combination of CANCaseXL, wire harness, crimping pins, connectors, receptacles, but not limited thereto, can be used as hardware(s) for interface.

In an exemplary implementation, Autonomous Emergency Braking (AEB), an automation feature with automation level-2 is validated utilizing system and method realized in accordance with implementations of the present disclosure. For the validation, at least one scenario, which includes sudden deceleration of target vehicle moving in front of the subject vehicle is considered. In accordance with implementations of the present disclosure, the scenario is decomposed into sensing and perception test bench, situation analysis and planning test bench, decision and logic test bench and actuation and motion control test bench, wherein validation is executed for each of the respective functionalities and values corresponding to function, performance and safety measurands is obtained. Evaluation matrix based on one or a combination of function, performance and safety measurands is generated. Finally, validation report is generated based on evaluation of execution of validation in said plurality of test benches and the evaluation matrix. In an implementation, validation measurands for sensing and perception test bench includes, but not limited to, functional validation viz. object and type detection, object tracking and distance to target and relative velocity measurement; performance validation viz. detection and tracking update rate and object detection confidence; safety validation viz. impact of weather on detection and object detection loss and the like. In an implementation, validation measurands for situation analysis and planning test bench includes, but not limited to, functional validation viz. selection and association of important target (front vehicle), tracking of important target and attributes of important target; performance validation viz. prediction of targets, update rate of important target and update rate of important target attributes; and safety validation viz. target of interest on detection losses, target of interest on faulty object data. In an implementation, validation measurands for decision and logic test bench includes, but not limited to, functional validation viz. closing range data validity and range, TTC calculation data validity and range, warning command activation as per strategy and braking command enable as per strategy; performance validation viz. false warning rates and command latencies; and safety validation viz. output tolerances with degraded inputs like distance to TOI and relative velocity. In an implementation, validation measurands for actuation and motion control test bench includes, but not limited to, functional validation viz. realization of braking command and braking distance achieved with respect to speeds; performance validation viz. vehicle braking response time, accuracy of braking distance and performance of continued braking; and safety validation viz. check brake command implementation and response for difference load conditions.

In an exemplary implementation, Highway Auto Pilot, an automation feature with automation level-3 is validated utilizing system and methods realized in accordance with implementations of the present disclosure. For the validation, at least one scenario, which includes target vehicle, being followed by the subject vehicle, cuts-out is considered. In accordance with implementations of the present disclosure, the scenario is decomposed into sensing and perception test bench, situation analysis and planning test bench, decision and logic test bench and actuation and motion control test bench, wherein validation is executed for each of the respective functionalities and values corresponding to function, performance and safety measurands is obtained. Evaluation matrix based on one or a combination of function, performance and safety measurands is generated. Finally, validation report is generated based on evaluation of execution of validation in said plurality of test benches and evaluation matrix. In an implementation, validation measurands for sensing and perception test bench includes, but not limited to, functional validation viz. object detection, object tracking and distance to target, relative velocity measurement, lane detection, road curvature detection; performance validation viz. detection and tracking update rate and object detection confidence; and safety validation viz. impact of weather on detection and object detection loss and the like. In an implementation, validation measurands for situation analysis and planning test bench includes, but not limited to, functional validation viz. selection and lane association of important target (front vehicle), tracking of important target and attributes of important target; performance validation viz. prediction of targets, update rate of important target and attributes of important target; and safety validation viz. target of interest on detection losses, target of interest on faulty object data. In an implementation, validation measurands for decision and logic test bench includes, but not limited to, functional validation viz. lateral correction and command determination, longitudinal correction and command determination, user override combination for the scenario; performance validation viz. target of interest update rate and prediction, lane maintenance; and safety validation viz. environmental conditions on speed regulation and lane maintenance, safe state upon faulty associations and inputs. In an implementation, validation measurands for actuation and motion control test bench includes, but not limited to, functional validation viz. vehicle steering angle/torque implementation, throttle/brake implementation; performance validation viz. steering rates for road curvature/speed, longitudinal distances accuracies; and safety validation viz. vehicle stability determination for combination of commands (arbitration of commands), safe state upon faulty plant model data.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

The present disclosure provides systems and methods for validation of features with different automation levels in automotive industry, obviating the need for waiting till completion of feature development for validation.

The present disclosure provides systems and methods that provides component reusability and enhancement for the bench setup with active load emulation in closed loop.

The present disclosure provides systems and methods for validation of autonomous features for all of the system function, safety and performance.

The present disclosure provides systems and methods for validation of autonomous features with flexibility of test setups to address different validation platform selection requirements like system with RTOS or embedded processor.

The present disclosure provides systems and methods for validation of autonomous features across all the functionalities including sensing and perception, situation analysis and planning, decision and logic building, and actuation and motion control.

The present disclosure provides systems and methods that allow adoption of open architecture.

The present disclosure provides systems and methods that can be customized to meet requirements for example, the system and methods of the present disclosure can be adapted to work for in-house developed features and/or OEM provided (off-the-shelf) features.

The present disclosure provides systems and methods for validation of features with different automation levels in automotive industry, output of which can be provided to the feature development team.

We claim:

1. A system for validation of an automation feature of an automobile, the system comprising: one or more processors; and a non-transitory storage device communicably coupled to the one or more processors, the non-transitory storage device having embodied thereon one or more routines executable by the one or more processors to cause the one or more processor to: test an automation feature of an automobile prior to implementing the automation feature in the automobile for in-automobile use, wherein the automation feature comprises at least one of a steering control or a breaking control of the automobile, wherein testing the automation feature comprises:
    grouping functions of the automation feature into a plurality of functional areas;
    selecting, from a plurality of scenarios in which the automated feature is expected to control one or more aspects of the automobile, at least one scenario under which the automation feature is to be validated;
    decomposing the at least one scenario into a plurality of test benches, wherein each of the plurality of test benches is based on at least one functional area of the plurality of functional areas;

generating an evaluation matrix based on at least one of an automation feature function validation measure and or an automation feature performance validation measure and or an automation feature safety validation measure and;

and quantitatively validating the plurality of functional areas of the automation feature in the plurality of test benches.

2. The system of claim 1, wherein the plurality of functional areas comprises at least one of sensing and perception, situation analysis and planning, decision and logic building, or actuation and motion control.

3. The system of claim 1, wherein the non-transitory storage device further stores one or more routines configured to cause the one or more processors to generate a validation report based on output of the one or more routines for quantitatively validating the plurality of functional areas and the one or more routines for generating the evaluation matrix.

4. The system of claim 3, wherein the validation report further includes an evaluation of each of the plurality of functional areas based on comparison of the at least one of the automation feature function validation measure and, the automation feature performance validation measure and, or the automation feature safety validation measure and to one or more reference values.

5. The method of claim 1, wherein validation of the automation feature in the automobile is performed in real-time.

6. The system of claim 1, wherein the one or more processors are configured to execute the one or more routines to automate testing of the automation feature of the vehicle and provide quantitative validation of the plurality of functional areas of the automation feature without requiring manual performance of in-automobile tests to validate the plurality of functional areas.

7. A method of validation of an automation feature of an automobile, the method comprising the steps of:

testing an automation feature of an automobile prior to implementing the automation feature in the automobile for in-automobile use, wherein the automation feature comprises at least one of a steering control or a breaking control of the automobile, wherein testing the automation feature comprises:
(a) assessing, using one or more processors, the automation feature to be validated;
(b) grouping, using the one or more processors, functions of the automation feature into a plurality of functional areas;
(c) selecting, using the one or more processors, from a plurality of scenarios in which the automated feature is expected to control one or more aspects of the automobile at least one scenario under which the automation feature is to be validated;
(d) decomposing, using the one or more processors, the at least one scenario into a plurality of test benches, wherein each of the plurality of test benches are based on at least one functional area of the plurality of functional areas;
(e) generating an evaluation matrix based on at least one of an automation feature function validation measurand, an automation feature performance validation measurand, or an automation feature safety validation measurand; and (f) quantitatively validating, using the one or more processors, functionality of the automation feature in at least one functional area of the plurality of functional areas.

8. The method of claim 7, wherein the plurality of functional areas comprise at least one of sensing and perception, situation analysis and planning, decision and logic building, or actuation and motion control.

9. The method of claim 7, further comprising generating validation report based on output of the test bench execution module and the test bench execution based evaluation matrix generation module.

10. The method of claim 9, further comprising generating the validation report to include an evaluation of each of the plurality of functional areas based on comparison of the at least one of the automation feature function validation measure and, the automation feature performance validation measure and, or the automation feature safety validation measure and to one or more reference values.

11. The method of claim 7, wherein validation of the automation feature in the automobile is performed in real-time.

12. The method of claim 7, further comprising providing quantitative validation of the plurality of functional areas of the automation feature without requiring manual performance of in-automobile tests to validate the plurality of functional areas.

13. At least one non-transitory machine-readable storage medium having instructions stored thereon, the instructions, when executed by at least one processor, causing the at least one processor to implement operations comprising: testing an automation feature of an automobile prior to implementing the automation feature in the automobile for in-automobile use, wherein the automation feature comprises at least one of a steering control or a breaking control of the automobile, wherein testing the automation feature comprises:
(a) assessing the automation feature to be validated;
(b) grouping functions of the automation feature into a plurality of functional areas;
(c) selecting, from a plurality of scenarios in which the automated feature is expected to control one or more aspects of the automobile, at least one scenario under which the automation feature is to be validated;
(d) decomposing the at least one scenario into a plurality of test benches, wherein each of the plurality of test benches are based on at least one functional area of the plurality of functional areas;
(e) generating an evaluation matrix based on at least one of an automation feature function validation measurand an automation feature performance validation measurand or an automation feature safety validation measurand; and
(f) quantitatively validating functionality of the automation feature in at least one functional area of the plurality of functional areas without requiring manual performance of in-automobile tests to validate the plurality of functional areas.

14. The at least one non-transitory machine-readable storage medium of claim 13, wherein the plurality of functional areas comprise at least one of sensing and perception, situation analysis and planning, decision and logic building, or actuation and motion control.

15. The at least one non-transitory machine-readable storage medium of claim 13, the operations further comprising generating validation report based on output of the test bench execution module and the test bench execution based evaluation matrix generation module.

16. The at least one non-transitory machine-readable storage medium of claim 15, the operations further comprising generating the validation report to include an evaluation of each of the plurality of functional areas based on comparison of the at least one of the automation feature function validation measure and, the automation feature performance validation measure and, or the automation feature safety validation measure and to one or more reference values.

17. The at least one non-transitory machine-readable storage medium of claim 13, wherein validation of the automation feature in the automobile is performed in real-time.

18. The system of claim 1, wherein testing the automation feature further comprises, responsive to the plurality of functional areas of the automation feature being quantitatively validated, subjecting the automation feature to in-vehicle testing in at least one of deterministic or un-deterministic environments.

19. The method of claim 7, wherein testing the automation feature further comprises, responsive to the plurality of functional areas of the automation feature being quantitatively validated, subjecting the automation feature to in-vehicle testing in at least one of deterministic or un-deterministic environments.

20. The at least one non-transitory machine-readable storage medium of claim 13, wherein testing the automation feature further comprises, responsive to the plurality of functional areas of the automation feature being quantitatively validated, subjecting the automation feature to in-vehicle testing in at least one of deterministic or un-deterministic environments.

\* \* \* \* \*